(12) United States Patent
Hong et al.

(10) Patent No.: US 9,788,013 B2
(45) Date of Patent: *Oct. 10, 2017

(54) VIDEO ENCODING METHOD AND DEVICE AND DECODING METHOD AND DEVICE

(71) Applicant: SAMSUNG ELECTRONICS CO., LTD., Suwon-si (KR)

(72) Inventors: Yoon-Mi Hong, Seoul (KR); Woo-Jin Han, Suwon-si (KR); Min-Su Cheon, Yongin-si (KR); Jianle Chen, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,931

(22) Filed: May 9, 2016

(65) Prior Publication Data

US 2016/0255372 A1    Sep. 1, 2016

Related U.S. Application Data

(63) Continuation of application No. 13/876,778, filed as application No. PCT/KR2011/007165 on Sep. 28, 2011, now Pat. No. 9,350,997.

(Continued)

(51) Int. Cl.
*H04N 19/60* (2014.01)
*G06F 17/14* (2006.01)
(Continued)

(52) U.S. Cl.
CPC .......... *H04N 19/60* (2014.11); *G06F 17/147* (2013.01); *H04N 19/126* (2014.11); *H04N 19/176* (2014.11); *H04N 19/625* (2014.11)

(58) Field of Classification Search
CPC ....... G06F 17/147; G06F 17/32; H04N 19/60; H04N 19/176; H04N 19/126; H04N 19/625
See application file for complete search history.

(56) References Cited

U.S. PATENT DOCUMENTS 5,642,438 A    6/1997  Babkin
6,134,270 A    10/2000 Mou
(Continued)

FOREIGN PATENT DOCUMENTS

CN    1568005 A    1/2005
CN    1589017 A    3/2005
(Continued)

OTHER PUBLICATIONS

"Fast Multiplierless Approximations of the DCT With the Lifting Scheme"Jie Liang et al., 1053-587X/01, Dec. 2001 © 2001 IEEE.*

(Continued)

*Primary Examiner* — Dramos I Kalapodas
(74) *Attorney, Agent, or Firm* — Sughrue Mion, PLLC

(57) ABSTRACT

A video encoding method, a video encoding apparatus, a video decoding method, and a video decoding apparatus are provided. The video encoding method includes producing a fast transform matrix based on a transform matrix which is used for frequency transformation on a block which has a predetermined size; producing a transformed block by transforming the block having the predetermined size by using the fast transform matrix; and performing scaling with respect to the transformed block in order to correct a difference between the transform matrix used for the frequency transformation and the fast transform matrix.

1 Claim, 24 Drawing Sheets

Related U.S. Application Data

(60) Provisional application No. 61/387,128, filed on Sep. 28, 2010.

(51) Int. Cl.
*H04N 19/625* (2014.01)
*H04N 19/126* (2014.01)
*H04N 19/176* (2014.01)

(56) References Cited

U.S. PATENT DOCUMENTS

| | | | |
|---|---|---|---|
| 6,694,342 | B1 | 2/2004 | Mou |
| 7,242,713 | B2 | 7/2007 | Srinivasan et al. |
| 7,487,193 | B2 | 2/2009 | Srinivasan et al. |
| 7,558,815 | B2 | 7/2009 | Mitchell et al. |
| 7,689,052 | B2 | 3/2010 | Sullivan et al. |
| 7,756,351 | B2 | 7/2010 | Dang |
| 7,839,928 | B2 | 11/2010 | Malvar |
| 7,876,976 | B2 | 1/2011 | Cho et al. |
| 7,881,371 | B2 | 2/2011 | Malvar |
| 8,059,716 | B2 | 11/2011 | Park et al. |
| 8,417,045 | B2 | 4/2013 | Hinds |
| 8,548,265 | B2 | 10/2013 | Tran et al. |
| 8,849,884 | B2 | 9/2014 | Reznik et al. |
| 2003/0078953 | A1 | 4/2003 | Hallapuro et al. |
| 2003/0093452 | A1* | 5/2003 | Zhou .................. G06F 17/147 708/520 |
| 2003/0206582 | A1 | 11/2003 | Srinivasan et al. |
| 2005/0069224 | A1 | 3/2005 | Nowicki et al. |
| 2005/0074062 | A1 | 4/2005 | Sung et al. |
| 2005/0256916 | A1 | 11/2005 | Srinivasan et al. |
| 2006/0080373 | A1 | 4/2006 | Hinds et al. |
| 2006/0294173 | A1 | 12/2006 | Hallapuro et al. |
| 2007/0058720 | A1 | 3/2007 | Park et al. |
| 2007/0196025 | A1 | 8/2007 | Tran et al. |
| 2007/0233764 | A1 | 10/2007 | Reznik et al. |
| 2007/0237236 | A1 | 10/2007 | Chang et al. |
| 2007/0237414 | A1 | 10/2007 | Cho et al. |
| 2007/0250557 | A1* | 10/2007 | Gotze .................. H04N 19/42 708/400 |
| 2007/0297504 | A1 | 12/2007 | Reznik et al. |
| 2012/0230395 | A1 | 9/2012 | Kerofsky et al. |

FOREIGN PATENT DOCUMENTS

| | | |
|---|---|---|
| JP | 2003-333598 A | 11/2003 |
| KR | 10-2007-0029524 A | 3/2007 |
| KR | 10-2007-0087455 A | 8/2007 |
| KR | 10-2008-0093302 A | 10/2008 |

OTHER PUBLICATIONS

"A High-Performance Hardware Implementation of the H.264 Simplified 8×8 Transformation and Quantization",Ihab Amer et al., 0-7803-8874/05© 2005 IEEE.*

Communication dated Jul. 13, 2015, issued by the State Intellectual Property Office of P.R. China in counterpart Chinese Application No. 201180046974.8.

Communication dated Mar. 1, 2016, issued by the National Office of Intellectual Property in counterpart Vietnamese Application No. 1-2013-01295.

Communication, Issued by the Australian Patent Office, Dated Aug. 1, 2014, in counterpart Australian Application No. 2011308204.

International Search Report (PCT/ISA/210), dated Apr. 23, 2012, issued by the International Searching Authority in corresponding International Application No. PCT/KR2011/007165.

Japanese Communication dated Jan. 28, 2014 issued by the Japanese Patent Office in counterpart Japanese Patent Application No. 2013-531492.

Liang et al., "Fast Multiplierless Approximations of the DCT With the Lifting Scheme", IEEE Transactions on Signal Processing, pp. 3032-3044, vol. 49, No. 12, Dec. 2001.

McCann, K. et al., "Samsung's Response to the Call for Proposals on Video Compression Technology," Joint Collaboration Team on Video Coding (JCT-VC) of ITU-T SG16 WP3 and ISO/IEC JTC/SC29/WG11, Apr. 15, 2010, 5 pages total.

Written Opinion (PCT/ISA/237), dated Apr. 23, 2012, issued by the International Searching Authority in corresponding International Application No. PCT/KR2011/007165.

Jie Liang et al., "Fast Multiplierless Approximations of the DCT With the Lifting Scheme", 1053-587X/01, Dec. 2001 © 2001 IEEE.

Ihab Amer et al., "A High-Performance Hardware Implementation of the H.264 Simplified 8×8 Transformation and Quantization", 0-7803-8874/05 © 2005 IEEE.

"Transform-Domain Wiener Filtering for H.264/AVC Video Encoding and Its Implementation" by Byung Cheol Song et al., 0-7803-9134/05 2005 IEEE.

"Fast Multiplierless Approximations of the DCT With the Lifting Scheme", by Jie Liang et al., (hereinafter Liang) 1053-587X/01, Dec. 2001 © 2001 IEEE.

"Transform-Domain Wiener Filtering for H.264/AVC Video Encoding and Its Implementation" by Byung Cheol Song et al., (hereinafter Song), 0-7803-9134/05 0 2005 IEEE.

"A High-Performance Hardware Implementation of the H.264 Simplified 8×8 Transformation and Quantization", by Ihab Amer et al., (herein after Amer), 0-7803-8874/05 © 2005 IEEE.

* cited by examiner

| 207 | 209 | 209 | 208 | 207 | 209 | 208 | 209 | 207 | 209 | 208 | 209 | 207 | 208 | 209 | 209 |
|---|---|---|---|---|---|---|---|---|---|---|---|---|---|---|---|
| 209 | 212 | 212 | 211 | 209 | 211 | 210 | 212 | 209 | 212 | 210 | 211 | 209 | 211 | 212 | 212 |
| 209 | 212 | 212 | 211 | 209 | 211 | 210 | 212 | 209 | 212 | 210 | 211 | 209 | 211 | 212 | 212 |
| 208 | 211 | 211 | 210 | 208 | 210 | 209 | 211 | 208 | 211 | 209 | 210 | 208 | 210 | 211 | 211 |
| 207 | 209 | 209 | 208 | 207 | 208 | 208 | 209 | 207 | 209 | 208 | 208 | 207 | 208 | 209 | 209 |
| 209 | 211 | 211 | 210 | 208 | 210 | 210 | 211 | 209 | 211 | 210 | 210 | 208 | 210 | 211 | 211 |
| 208 | 210 | 210 | 209 | 208 | 210 | 209 | 210 | 208 | 211 | 209 | 210 | 208 | 209 | 210 | 210 |
| 209 | 212 | 212 | 211 | 209 | 211 | 210 | 212 | 209 | 212 | 210 | 211 | 209 | 211 | 212 | 212 |
| 207 | 209 | 209 | 208 | 207 | 209 | 208 | 209 | 207 | 210 | 208 | 209 | 207 | 208 | 209 | 209 |
| 209 | 212 | 212 | 211 | 209 | 211 | 211 | 212 | 210 | 212 | 210 | 211 | 209 | 211 | 212 | 212 |
| 208 | 210 | 210 | 209 | 208 | 210 | 209 | 210 | 208 | 210 | 209 | 210 | 208 | 209 | 210 | 210 |
| 209 | 211 | 211 | 210 | 208 | 210 | 210 | 211 | 209 | 211 | 210 | 210 | 208 | 210 | 211 | 211 |
| 207 | 209 | 209 | 208 | 207 | 208 | 208 | 209 | 207 | 209 | 208 | 208 | 207 | 208 | 209 | 209 |
| 208 | 211 | 211 | 210 | 208 | 210 | 209 | 211 | 208 | 211 | 209 | 210 | 208 | 210 | 211 | 211 |
| 209 | 212 | 212 | 211 | 209 | 211 | 210 | 212 | 209 | 212 | 210 | 211 | 209 | 211 | 212 | 212 |
| 209 | 212 | 212 | 211 | 209 | 211 | 210 | 212 | 209 | 212 | 210 | 211 | 209 | 211 | 212 | 212 |

| 188 | 190 | 190 | 189 | 188 | 190 | 189 | 190 | 188 | 190 | 189 | 190 | 188 | 189 | 190 | 190 |
|---|---|---|---|---|---|---|---|---|---|---|---|---|---|---|---|
| 190 | 192 | 192 | 191 | 190 | 192 | 191 | 192 | 190 | 193 | 191 | 192 | 190 | 191 | 192 | 192 |
| 190 | 192 | 192 | 191 | 190 | 192 | 191 | 192 | 190 | 192 | 191 | 192 | 190 | 191 | 192 | 192 |
| 189 | 191 | 191 | 190 | 189 | 191 | 190 | 191 | 189 | 192 | 190 | 191 | 189 | 190 | 191 | 191 |
| 188 | 190 | 190 | 189 | 188 | 189 | 189 | 190 | 188 | 190 | 189 | 189 | 188 | 189 | 190 | 190 |
| 190 | 192 | 192 | 191 | 189 | 191 | 191 | 192 | 190 | 192 | 191 | 191 | 189 | 191 | 192 | 192 |
| 189 | 191 | 191 | 190 | 189 | 191 | 190 | 191 | 189 | 191 | 190 | 191 | 189 | 190 | 191 | 191 |
| 190 | 192 | 192 | 191 | 190 | 192 | 191 | 193 | 190 | 193 | 191 | 192 | 190 | 191 | 192 | 192 |
| 188 | 190 | 190 | 189 | 188 | 190 | 189 | 190 | 188 | 190 | 189 | 190 | 188 | 189 | 190 | 190 |
| 190 | 193 | 192 | 192 | 190 | 192 | 191 | 193 | 190 | 193 | 191 | 192 | 190 | 192 | 192 | 193 |
| 189 | 191 | 191 | 190 | 189 | 191 | 190 | 191 | 189 | 191 | 190 | 191 | 189 | 190 | 191 | 191 |
| 190 | 192 | 192 | 191 | 189 | 191 | 191 | 192 | 190 | 192 | 191 | 191 | 189 | 191 | 192 | 192 |
| 188 | 190 | 190 | 189 | 188 | 189 | 189 | 190 | 188 | 190 | 189 | 189 | 188 | 189 | 190 | 190 |
| 189 | 191 | 191 | 190 | 189 | 191 | 190 | 191 | 189 | 192 | 190 | 191 | 189 | 190 | 191 | 191 |
| 190 | 192 | 192 | 191 | 190 | 192 | 191 | 192 | 190 | 192 | 191 | 192 | 190 | 191 | 192 | 192 |
| 190 | 192 | 192 | 191 | 190 | 192 | 191 | 192 | 190 | 193 | 191 | 192 | 190 | 191 | 192 | 192 |

| 159 | 161 | 161 | 160 | 159 | 160 | 160 | 161 | 159 | 161 | 160 | 160 | 159 | 160 | 161 | 161 |
|---|---|---|---|---|---|---|---|---|---|---|---|---|---|---|---|
| 161 | 163 | 163 | 162 | 161 | 162 | 162 | 163 | 161 | 163 | 162 | 162 | 161 | 162 | 163 | 163 |
| 161 | 163 | 163 | 162 | 161 | 162 | 162 | 163 | 161 | 163 | 162 | 162 | 161 | 162 | 163 | 163 |
| 160 | 162 | 162 | 161 | 160 | 161 | 161 | 162 | 160 | 162 | 161 | 161 | 160 | 161 | 162 | 162 |
| 159 | 161 | 161 | 160 | 159 | 160 | 160 | 161 | 159 | 161 | 160 | 160 | 159 | 160 | 161 | 161 |
| 160 | 162 | 162 | 161 | 160 | 162 | 161 | 162 | 160 | 162 | 161 | 162 | 160 | 161 | 162 | 162 |
| 160 | 162 | 162 | 161 | 160 | 161 | 161 | 162 | 160 | 162 | 161 | 161 | 160 | 161 | 162 | 162 |
| 161 | 163 | 163 | 162 | 161 | 162 | 162 | 163 | 161 | 163 | 162 | 162 | 161 | 162 | 163 | 163 |
| 159 | 161 | 161 | 160 | 159 | 160 | 160 | 161 | 159 | 161 | 160 | 160 | 159 | 160 | 161 | 161 |
| 161 | 163 | 163 | 162 | 161 | 162 | 162 | 163 | 161 | 163 | 162 | 162 | 161 | 162 | 163 | 163 |
| 160 | 162 | 162 | 161 | 160 | 161 | 161 | 162 | 160 | 162 | 161 | 161 | 160 | 161 | 162 | 162 |
| 160 | 162 | 162 | 161 | 160 | 162 | 161 | 162 | 160 | 162 | 161 | 162 | 160 | 161 | 162 | 162 |
| 159 | 161 | 161 | 160 | 159 | 160 | 160 | 161 | 159 | 161 | 160 | 160 | 159 | 160 | 161 | 161 |
| 160 | 162 | 162 | 161 | 160 | 161 | 161 | 162 | 160 | 162 | 161 | 161 | 160 | 161 | 162 | 162 |
| 161 | 163 | 163 | 162 | 161 | 162 | 162 | 163 | 161 | 163 | 162 | 162 | 161 | 162 | 163 | 163 |
| 161 | 163 | 163 | 162 | 161 | 162 | 162 | 163 | 161 | 163 | 162 | 162 | 161 | 162 | 163 | 163 |

| 148 | 150 | 150 | 149 | 148 | 149 | 149 | 150 | 148 | 150 | 149 | 149 | 148 | 149 | 150 | 150 |
|---|---|---|---|---|---|---|---|---|---|---|---|---|---|---|---|
| 150 | 151 | 151 | 150 | 149 | 151 | 150 | 151 | 150 | 151 | 150 | 151 | 149 | 150 | 151 | 151 |
| 150 | 151 | 151 | 150 | 149 | 151 | 150 | 151 | 150 | 151 | 150 | 151 | 149 | 150 | 151 | 151 |
| 149 | 150 | 150 | 150 | 149 | 150 | 150 | 150 | 149 | 150 | 150 | 150 | 149 | 150 | 150 | 150 |
| 148 | 149 | 149 | 149 | 148 | 149 | 149 | 149 | 148 | 149 | 149 | 149 | 148 | 149 | 149 | 149 |
| 149 | 151 | 151 | 150 | 149 | 150 | 150 | 151 | 149 | 151 | 150 | 150 | 149 | 150 | 151 | 151 |
| 149 | 150 | 150 | 150 | 149 | 150 | 149 | 150 | 149 | 150 | 149 | 150 | 149 | 150 | 150 | 150 |
| 150 | 151 | 151 | 150 | 149 | 151 | 150 | 151 | 150 | 151 | 150 | 151 | 149 | 150 | 151 | 151 |
| 148 | 150 | 150 | 149 | 148 | 149 | 149 | 150 | 148 | 150 | 149 | 149 | 148 | 149 | 150 | 150 |
| 150 | 151 | 151 | 150 | 149 | 151 | 150 | 151 | 150 | 151 | 150 | 151 | 149 | 150 | 151 | 151 |
| 149 | 150 | 150 | 150 | 149 | 150 | 149 | 150 | 149 | 150 | 149 | 150 | 149 | 150 | 150 | 150 |
| 149 | 151 | 151 | 150 | 149 | 150 | 150 | 151 | 149 | 151 | 150 | 150 | 149 | 150 | 151 | 151 |
| 148 | 149 | 149 | 149 | 148 | 149 | 149 | 149 | 148 | 149 | 149 | 149 | 148 | 149 | 149 | 149 |
| 149 | 150 | 150 | 150 | 149 | 150 | 150 | 150 | 149 | 150 | 150 | 150 | 149 | 150 | 150 | 150 |
| 150 | 151 | 151 | 150 | 149 | 151 | 150 | 151 | 150 | 151 | 150 | 151 | 149 | 150 | 151 | 151 |
| 150 | 151 | 151 | 150 | 149 | 151 | 150 | 151 | 150 | 151 | 150 | 151 | 149 | 150 | 151 | 151 |

| 129 | 131 | 131 | 130 | 129 | 130 | 130 | 131 | 129 | 131 | 130 | 130 | 129 | 130 | 131 | 131 |
|---|---|---|---|---|---|---|---|---|---|---|---|---|---|---|---|
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 130 | 131 | 131 | 131 | 130 | 131 | 131 | 132 | 130 | 132 | 131 | 131 | 130 | 131 | 131 | 131 |
| 131 | 132 | 132 | 132 | 131 | 132 | 132 | 132 | 131 | 132 | 132 | 132 | 131 | 132 | 132 | 132 |
| 129 | 131 | 131 | 130 | 129 | 130 | 130 | 131 | 129 | 131 | 130 | 130 | 129 | 130 | 131 | 131 |
| 131 | 132 | 132 | 132 | 131 | 132 | 132 | 132 | 131 | 132 | 132 | 132 | 131 | 132 | 132 | 132 |
| 130 | 131 | 131 | 131 | 130 | 131 | 131 | 132 | 130 | 132 | 131 | 131 | 130 | 131 | 131 | 131 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |

| 115 | 116 | 116 | 116 | 115 | 116 | 116 | 116 | 115 | 116 | 116 | 116 | 115 | 116 | 116 | 116 |
|---|---|---|---|---|---|---|---|---|---|---|---|---|---|---|---|
| 116 | 118 | 118 | 117 | 116 | 117 | 117 | 118 | 116 | 118 | 117 | 117 | 116 | 117 | 118 | 118 |
| 116 | 118 | 118 | 117 | 116 | 117 | 117 | 118 | 116 | 118 | 117 | 117 | 116 | 117 | 118 | 118 |
| 116 | 117 | 117 | 116 | 116 | 117 | 116 | 117 | 116 | 117 | 116 | 117 | 116 | 116 | 117 | 117 |
| 115 | 116 | 116 | 116 | 115 | 116 | 116 | 116 | 115 | 116 | 116 | 116 | 115 | 116 | 116 | 116 |
| 116 | 117 | 117 | 117 | 116 | 117 | 116 | 117 | 116 | 117 | 116 | 117 | 116 | 117 | 117 | 117 |
| 116 | 117 | 117 | 116 | 116 | 116 | 116 | 117 | 116 | 117 | 116 | 116 | 116 | 116 | 117 | 117 |
| 116 | 118 | 118 | 117 | 116 | 117 | 117 | 118 | 116 | 118 | 117 | 117 | 116 | 117 | 118 | 118 |
| 115 | 116 | 116 | 116 | 115 | 116 | 116 | 116 | 115 | 116 | 116 | 116 | 115 | 116 | 116 | 116 |
| 116 | 118 | 118 | 117 | 116 | 117 | 117 | 118 | 116 | 118 | 117 | 117 | 116 | 117 | 118 | 118 |
| 116 | 117 | 117 | 116 | 116 | 116 | 116 | 117 | 116 | 117 | 116 | 116 | 116 | 116 | 117 | 117 |
| 116 | 117 | 117 | 117 | 116 | 117 | 116 | 117 | 116 | 117 | 116 | 117 | 116 | 117 | 117 | 117 |
| 115 | 116 | 116 | 116 | 115 | 116 | 116 | 116 | 115 | 116 | 116 | 116 | 115 | 116 | 116 | 116 |
| 116 | 117 | 117 | 116 | 116 | 117 | 116 | 117 | 116 | 117 | 116 | 117 | 116 | 116 | 117 | 117 |
| 116 | 118 | 118 | 117 | 116 | 117 | 117 | 118 | 116 | 118 | 117 | 117 | 116 | 117 | 118 | 118 |
| 116 | 118 | 118 | 117 | 116 | 117 | 117 | 118 | 116 | 118 | 117 | 117 | 116 | 117 | 118 | 118 |

| 81 | 82 | 82 | 81 | 81 | 81 | 81 | 82 | 81 | 82 | 81 | 81 | 81 | 81 | 82 | 82 |
|----|----|----|----|----|----|----|----|----|----|----|----|----|----|----|----|
| 82 | 83 | 83 | 82 | 82 | 82 | 82 | 83 | 82 | 83 | 82 | 82 | 82 | 82 | 83 | 83 |
| 82 | 83 | 83 | 82 | 82 | 82 | 82 | 83 | 82 | 83 | 82 | 82 | 82 | 82 | 83 | 83 |
| 81 | 82 | 82 | 82 | 81 | 82 | 82 | 82 | 81 | 82 | 82 | 82 | 81 | 82 | 82 | 82 |
| 81 | 82 | 82 | 81 | 81 | 81 | 81 | 82 | 81 | 82 | 81 | 81 | 81 | 81 | 82 | 82 |
| 81 | 82 | 82 | 82 | 81 | 82 | 82 | 82 | 81 | 82 | 82 | 82 | 81 | 82 | 82 | 82 |
| 81 | 82 | 82 | 82 | 81 | 82 | 82 | 82 | 81 | 82 | 82 | 82 | 81 | 82 | 82 | 82 |
| 82 | 83 | 83 | 82 | 82 | 82 | 82 | 83 | 82 | 83 | 82 | 82 | 82 | 82 | 83 | 83 |
| 81 | 82 | 82 | 81 | 81 | 81 | 81 | 82 | 81 | 82 | 81 | 81 | 81 | 81 | 82 | 82 |
| 82 | 83 | 83 | 82 | 82 | 82 | 82 | 83 | 82 | 83 | 82 | 82 | 82 | 82 | 83 | 83 |
| 81 | 82 | 82 | 82 | 81 | 82 | 82 | 82 | 81 | 82 | 82 | 82 | 81 | 82 | 82 | 82 |
| 81 | 82 | 82 | 82 | 81 | 82 | 82 | 82 | 81 | 82 | 82 | 82 | 81 | 82 | 82 | 82 |
| 81 | 82 | 82 | 81 | 81 | 81 | 81 | 82 | 81 | 82 | 81 | 81 | 81 | 81 | 82 | 82 |
| 81 | 82 | 82 | 82 | 81 | 82 | 82 | 82 | 81 | 82 | 82 | 82 | 81 | 82 | 82 | 82 |
| 82 | 83 | 83 | 82 | 82 | 82 | 82 | 83 | 82 | 83 | 82 | 82 | 82 | 82 | 83 | 83 |
| 82 | 83 | 83 | 82 | 82 | 82 | 82 | 83 | 82 | 83 | 82 | 82 | 82 | 82 | 83 | 83 |

| 89 | 90 | 90 | 90 | 89 | 90 | 89 | 90 | 89 | 90 | 89 | 90 | 89 | 90 | 90 | 90 |
|----|----|----|----|----|----|----|----|----|----|----|----|----|----|----|----|
| 90 | 91 | 91 | 90 | 90 | 91 | 90 | 91 | 90 | 91 | 90 | 91 | 90 | 90 | 91 | 91 |
| 90 | 91 | 91 | 90 | 90 | 91 | 90 | 91 | 90 | 91 | 90 | 91 | 90 | 90 | 91 | 91 |
| 90 | 90 | 90 | 90 | 89 | 90 | 90 | 91 | 90 | 91 | 90 | 90 | 89 | 90 | 90 | 90 |
| 89 | 90 | 90 | 89 | 89 | 90 | 89 | 90 | 89 | 90 | 89 | 90 | 89 | 89 | 90 | 90 |
| 90 | 91 | 91 | 90 | 90 | 90 | 90 | 91 | 90 | 91 | 90 | 90 | 90 | 90 | 91 | 91 |
| 89 | 90 | 90 | 90 | 89 | 90 | 90 | 90 | 89 | 90 | 90 | 90 | 89 | 90 | 90 | 90 |
| 90 | 91 | 91 | 91 | 90 | 91 | 90 | 91 | 90 | 91 | 90 | 91 | 90 | 91 | 91 | 91 |
| 89 | 90 | 90 | 90 | 89 | 90 | 89 | 90 | 89 | 90 | 89 | 90 | 89 | 90 | 90 | 90 |
| 90 | 91 | 91 | 91 | 90 | 91 | 90 | 91 | 90 | 91 | 90 | 91 | 90 | 91 | 91 | 91 |
| 89 | 90 | 90 | 90 | 89 | 90 | 90 | 90 | 89 | 90 | 90 | 90 | 89 | 90 | 90 | 90 |
| 90 | 91 | 91 | 90 | 90 | 90 | 90 | 91 | 90 | 91 | 90 | 90 | 90 | 90 | 91 | 91 |
| 89 | 90 | 90 | 89 | 89 | 90 | 89 | 90 | 89 | 90 | 89 | 90 | 89 | 89 | 90 | 90 |
| 90 | 90 | 90 | 90 | 89 | 90 | 90 | 91 | 90 | 91 | 90 | 90 | 89 | 90 | 90 | 90 |
| 90 | 91 | 91 | 90 | 90 | 91 | 90 | 91 | 90 | 91 | 90 | 91 | 90 | 90 | 91 | 91 |
| 90 | 91 | 91 | 90 | 90 | 91 | 90 | 91 | 90 | 91 | 90 | 91 | 90 | 90 | 91 | 91 |

| 105 | 106 | 106 | 106 | 105 | 106 | 106 | 106 | 105 | 106 | 106 | 106 | 105 | 106 | 106 | 106 |
|---|---|---|---|---|---|---|---|---|---|---|---|---|---|---|---|
| 106 | 107 | 107 | 107 | 106 | 107 | 107 | 108 | 106 | 108 | 107 | 107 | 106 | 107 | 107 | 107 |
| 106 | 107 | 107 | 107 | 106 | 107 | 107 | 107 | 106 | 108 | 107 | 107 | 106 | 107 | 107 | 107 |
| 106 | 107 | 107 | 106 | 106 | 107 | 106 | 107 | 106 | 107 | 106 | 107 | 106 | 106 | 107 | 107 |
| 105 | 106 | 106 | 106 | 105 | 106 | 106 | 106 | 105 | 106 | 106 | 106 | 105 | 106 | 106 | 106 |
| 106 | 107 | 107 | 107 | 106 | 107 | 106 | 107 | 106 | 107 | 106 | 107 | 106 | 107 | 107 | 107 |
| 106 | 107 | 107 | 106 | 106 | 106 | 106 | 107 | 106 | 107 | 106 | 106 | 106 | 106 | 107 | 107 |
| 106 | 108 | 107 | 107 | 106 | 107 | 107 | 108 | 106 | 108 | 107 | 107 | 106 | 107 | 107 | 108 |
| 105 | 106 | 106 | 106 | 105 | 106 | 106 | 106 | 105 | 106 | 106 | 106 | 105 | 106 | 106 | 106 |
| 106 | 108 | 108 | 107 | 106 | 107 | 107 | 108 | 106 | 108 | 107 | 107 | 106 | 107 | 108 | 108 |
| 106 | 107 | 107 | 106 | 106 | 106 | 106 | 107 | 106 | 107 | 106 | 106 | 106 | 106 | 107 | 107 |
| 106 | 107 | 107 | 107 | 106 | 107 | 106 | 107 | 106 | 107 | 106 | 107 | 106 | 107 | 107 | 107 |
| 105 | 106 | 106 | 106 | 105 | 106 | 106 | 106 | 105 | 106 | 106 | 106 | 105 | 106 | 106 | 106 |
| 106 | 107 | 107 | 106 | 106 | 107 | 106 | 107 | 106 | 107 | 106 | 107 | 106 | 106 | 107 | 107 |
| 106 | 107 | 107 | 107 | 106 | 107 | 107 | 107 | 106 | 108 | 107 | 107 | 106 | 107 | 107 | 107 |
| 106 | 107 | 107 | 107 | 106 | 107 | 107 | 108 | 106 | 108 | 107 | 107 | 106 | 107 | 107 | 107 |

| 113 | 115 | 114 | 114 | 113 | 114 | 114 | 115 | 113 | 115 | 114 | 114 | 113 | 114 | 114 | 114 |
|---|---|---|---|---|---|---|---|---|---|---|---|---|---|---|---|
| 115 | 116 | 116 | 115 | 114 | 115 | 115 | 116 | 115 | 116 | 115 | 115 | 114 | 115 | 116 | 116 |
| 114 | 116 | 116 | 115 | 114 | 115 | 115 | 116 | 114 | 116 | 115 | 115 | 114 | 115 | 116 | 116 |
| 114 | 115 | 115 | 115 | 114 | 115 | 114 | 115 | 114 | 115 | 114 | 115 | 114 | 115 | 115 | 115 |
| 113 | 114 | 114 | 114 | 113 | 114 | 114 | 114 | 113 | 114 | 114 | 114 | 113 | 114 | 114 | 114 |
| 114 | 115 | 115 | 115 | 114 | 115 | 115 | 115 | 114 | 115 | 115 | 115 | 114 | 115 | 115 | 115 |
| 114 | 115 | 115 | 114 | 114 | 115 | 114 | 115 | 114 | 115 | 114 | 115 | 114 | 114 | 115 | 115 |
| 115 | 116 | 116 | 115 | 114 | 115 | 115 | 116 | 115 | 116 | 115 | 115 | 114 | 115 | 116 | 116 |
| 113 | 115 | 114 | 114 | 113 | 114 | 114 | 115 | 113 | 115 | 114 | 114 | 113 | 114 | 114 | 115 |
| 115 | 116 | 116 | 115 | 114 | 115 | 115 | 116 | 115 | 116 | 115 | 115 | 114 | 115 | 116 | 116 |
| 114 | 115 | 115 | 114 | 114 | 115 | 114 | 115 | 114 | 115 | 114 | 115 | 114 | 114 | 115 | 115 |
| 114 | 115 | 115 | 115 | 114 | 115 | 115 | 115 | 114 | 115 | 115 | 115 | 114 | 115 | 115 | 115 |
| 113 | 114 | 114 | 114 | 113 | 114 | 114 | 114 | 113 | 114 | 114 | 114 | 113 | 114 | 114 | 114 |
| 114 | 115 | 115 | 115 | 114 | 115 | 114 | 115 | 114 | 115 | 114 | 115 | 114 | 115 | 115 | 115 |
| 114 | 116 | 116 | 115 | 114 | 115 | 115 | 116 | 114 | 116 | 115 | 115 | 114 | 115 | 116 | 116 |
| 114 | 116 | 116 | 115 | 114 | 115 | 115 | 116 | 115 | 116 | 115 | 115 | 114 | 115 | 116 | 116 |

| 129 | 131 | 131 | 130 | 129 | 130 | 130 | 131 | 129 | 131 | 130 | 130 | 129 | 130 | 131 | 131 |
|---|---|---|---|---|---|---|---|---|---|---|---|---|---|---|---|
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 130 | 131 | 131 | 131 | 130 | 131 | 131 | 132 | 130 | 132 | 131 | 131 | 130 | 131 | 131 | 131 |
| 131 | 132 | 132 | 132 | 131 | 132 | 132 | 132 | 131 | 132 | 132 | 132 | 131 | 132 | 132 | 132 |
| 129 | 131 | 131 | 130 | 129 | 130 | 130 | 131 | 129 | 131 | 130 | 130 | 129 | 130 | 131 | 131 |
| 131 | 132 | 132 | 132 | 131 | 132 | 132 | 132 | 131 | 132 | 132 | 132 | 131 | 132 | 132 | 132 |
| 130 | 131 | 131 | 131 | 130 | 131 | 131 | 132 | 130 | 132 | 131 | 131 | 130 | 131 | 131 | 131 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |

| 146 | 147 | 147 | 146 | 146 | 147 | 146 | 147 | 146 | 147 | 146 | 147 | 145 | 146 | 147 | 147 |
|---|---|---|---|---|---|---|---|---|---|---|---|---|---|---|---|
| 147 | 149 | 149 | 148 | 147 | 148 | 148 | 149 | 147 | 149 | 148 | 148 | 147 | 148 | 149 | 149 |
| 147 | 149 | 149 | 148 | 147 | 148 | 148 | 149 | 147 | 149 | 148 | 148 | 147 | 148 | 149 | 149 |
| 146 | 148 | 148 | 147 | 146 | 147 | 147 | 148 | 146 | 148 | 147 | 147 | 146 | 147 | 148 | 148 |
| 146 | 147 | 147 | 146 | 145 | 147 | 146 | 147 | 146 | 147 | 146 | 147 | 145 | 146 | 147 | 147 |
| 147 | 148 | 148 | 147 | 147 | 148 | 147 | 148 | 147 | 148 | 147 | 148 | 147 | 147 | 148 | 148 |
| 146 | 148 | 148 | 147 | 146 | 147 | 147 | 148 | 146 | 148 | 147 | 147 | 146 | 147 | 148 | 148 |
| 147 | 149 | 149 | 148 | 147 | 148 | 148 | 149 | 147 | 149 | 148 | 148 | 147 | 148 | 149 | 149 |
| 146 | 147 | 147 | 146 | 146 | 147 | 146 | 147 | 146 | 147 | 146 | 147 | 146 | 146 | 147 | 147 |
| 147 | 149 | 149 | 148 | 147 | 148 | 148 | 149 | 147 | 149 | 148 | 148 | 147 | 148 | 149 | 149 |
| 146 | 148 | 148 | 147 | 146 | 147 | 147 | 148 | 146 | 148 | 147 | 147 | 146 | 147 | 148 | 148 |
| 147 | 148 | 148 | 147 | 147 | 148 | 147 | 148 | 147 | 148 | 147 | 148 | 147 | 147 | 148 | 148 |
| 145 | 147 | 147 | 146 | 145 | 147 | 146 | 147 | 146 | 147 | 146 | 147 | 145 | 146 | 147 | 147 |
| 146 | 148 | 148 | 147 | 146 | 147 | 147 | 148 | 146 | 148 | 147 | 147 | 146 | 147 | 148 | 148 |
| 147 | 149 | 149 | 148 | 147 | 148 | 148 | 149 | 147 | 149 | 148 | 148 | 147 | 148 | 149 | 149 |
| 147 | 149 | 149 | 148 | 147 | 148 | 148 | 149 | 147 | 149 | 148 | 148 | 147 | 148 | 149 | 149 |

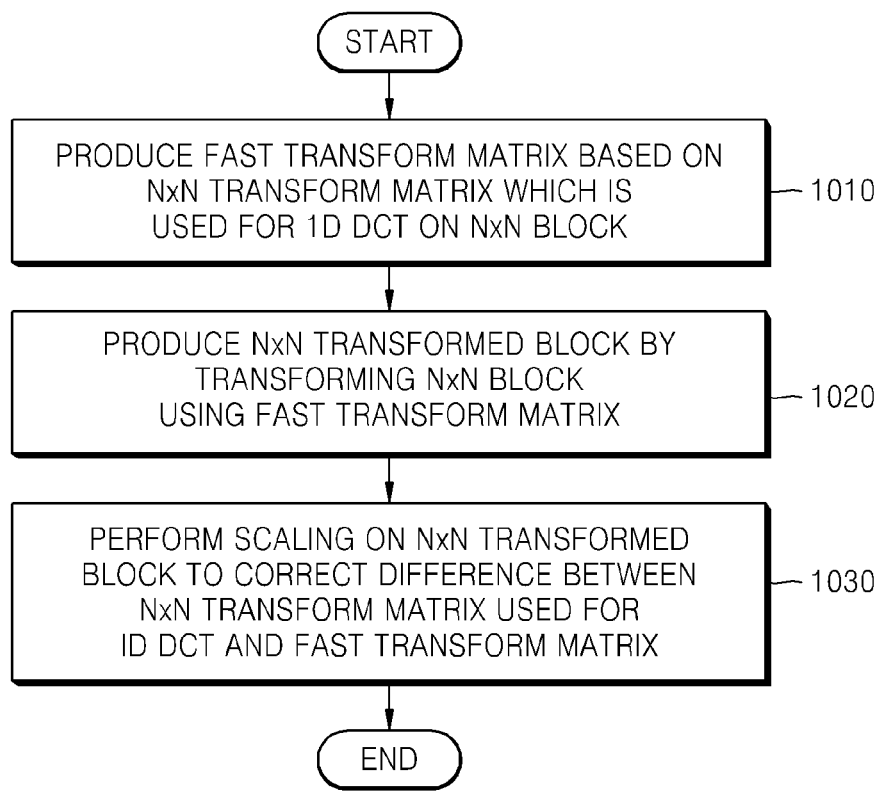

VIDEO ENCODING METHOD AND DEVICE AND DECODING METHOD AND DEVICE

CROSS-REFERENCE TO RELATED APPLICATIONS

This is continuation of application Ser. No. 13/876,778, filed Mar. 28, 2013, which is a national stage entry of International Patent Application No. PCT/KR2011/007165, filed on Sep. 28, 2011, and claims the benefit of U.S. Provisional Patent Application No. 61/387,128, filed on Sep. 28, 2010 in the U.S. Patent and Trademark Office, the disclosures of which are incorporated herein by reference in their entireties.

TECHNICAL FIELD

Exemplary embodiments relate to a video encoding method, a video encoding apparatus, a video decoding method, and a video decoding apparatus, and more particularly, to a method and apparatus for transforming a large-sized block, and a method and apparatus for inversely transforming a large-sized transformed block.

BACKGROUND

According to a current international video coding standard, such as H.264 or MPEG-4, a video signal is hierarchically divided into a sequence, a frame, a slice, a macroblock, and a block, wherein the block is a minimum processing unit. With respect to encoding, a prediction remaining error of the block is determined via intra-frame or inter-frame prediction, block transformation is performed such that energy is focused on a coefficient of a decimal, and image data is compressed and recorded as a coded bitstream via quantization, scanning, run-length coding, and entropy coding. With respect to decoding, processes are performed in the opposite order. First, a block transformation coefficient of entropy coding is extracted from a bitstream. Then, a prediction remaining error of a block is reconstructed via inverse-quantization and inverse-transformation, and prediction information is used to reconstruct video data of the block. In an encoding-decoding process, a transformation module is a base of video compression, and transformation performance of the transformation module directly affects the general performance of a codec.

Discrete cosine transform (DCT) has been employed in conjunction with an initial video coding standard, such as MPEG-1 or H.261. After DCT was introduced in 1974, DCT has been widely used in image and video coding fields. Transformation performance of DCT is excellent compared to all sub-optimal transforms, because DCT removes a correlation of image elements in a transformation domain and prepares a base for highly-efficient image compression. However, because a DCT matrix is expressed using floating point numbers, many system resources are used due to massive floating point operations. Accordingly, a new DCT algorithm is required so as to improve transformation efficiency while performing transformation on a large-size block.

Technical Problem

One or more exemplary embodiments provide a video encoding method, a video encoding apparatus, a video decoding method, and a video decoding apparatus that enable fast frequency transformation with respect to a large-sized block. One or more exemplary embodiments also provide a video encoding method, a video encoding apparatus, a video decoding method, and a video decoding apparatus, in which transform errors that may be generated when using fast frequency transformation may be compensated for via scaling or de-scaling performed in a quantization or dequantization process.

Technical Solution

According to an exemplary embodiment, an error in a result of inverse DCT (IDCT) which is obtained using a fast transformation matrix is reduced by performing scaling with respect to a transformed block.

Advantageous Effects

In image transformation and image inverse-transformation according to one or more exemplary embodiments, an operation based on an integer instead of a floating point operation is performed when a large block is transformed and inversely transformed, so that calculation complexity is reduced and an operation speed is increased.

In addition, an error value as between performance of a transformation based on a floating point operation and performance of a fast transformation may be compensated for by performing scaling and descaling during the quantization or the dequantization.

BRIEF DESCRIPTION OF THE DRAWINGS

The above and other features and advantages of the present inventive concept will become more apparent by describing in detail exemplary embodiments thereof with reference to the attached drawings in which:

FIGS. 4A, 4B, 4C, 4D, 4E, and 4F illustrate scaling matrices based on quantization parameters for use in performing a transformation with respect to a 16×16 block, according to an exemplary embodiment;

Figure 5A:
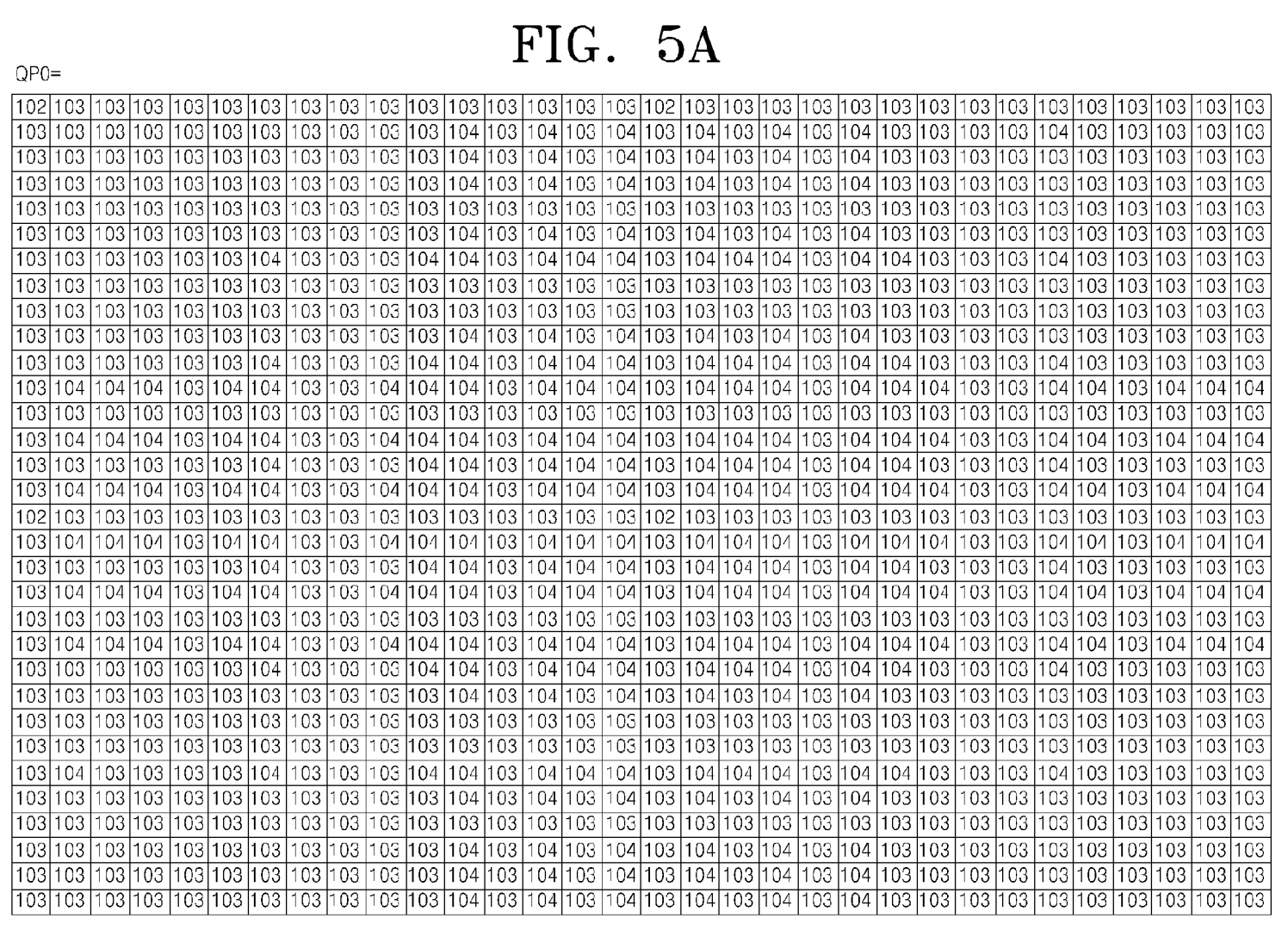
Figure 5B:
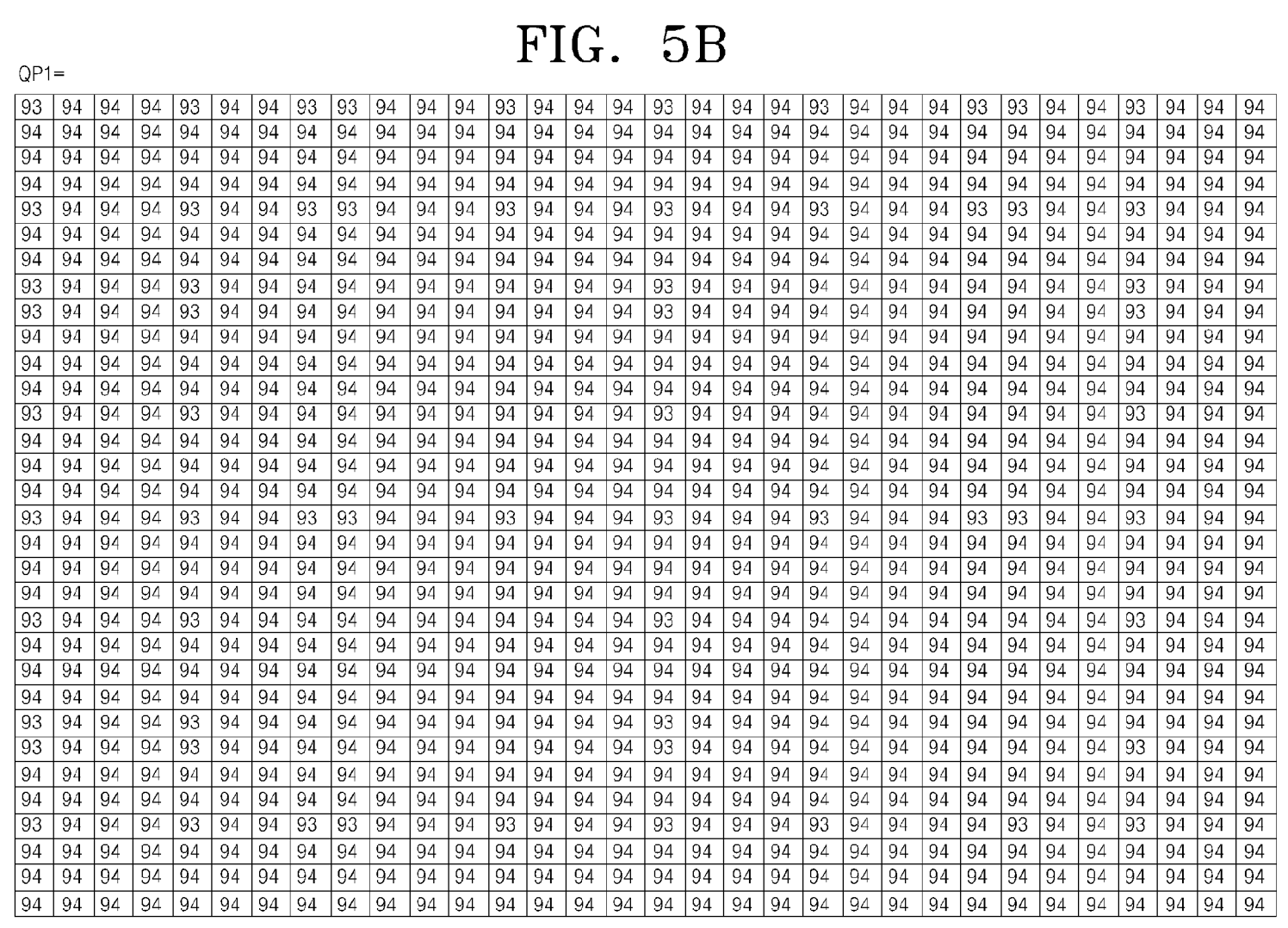
Figure 5C:
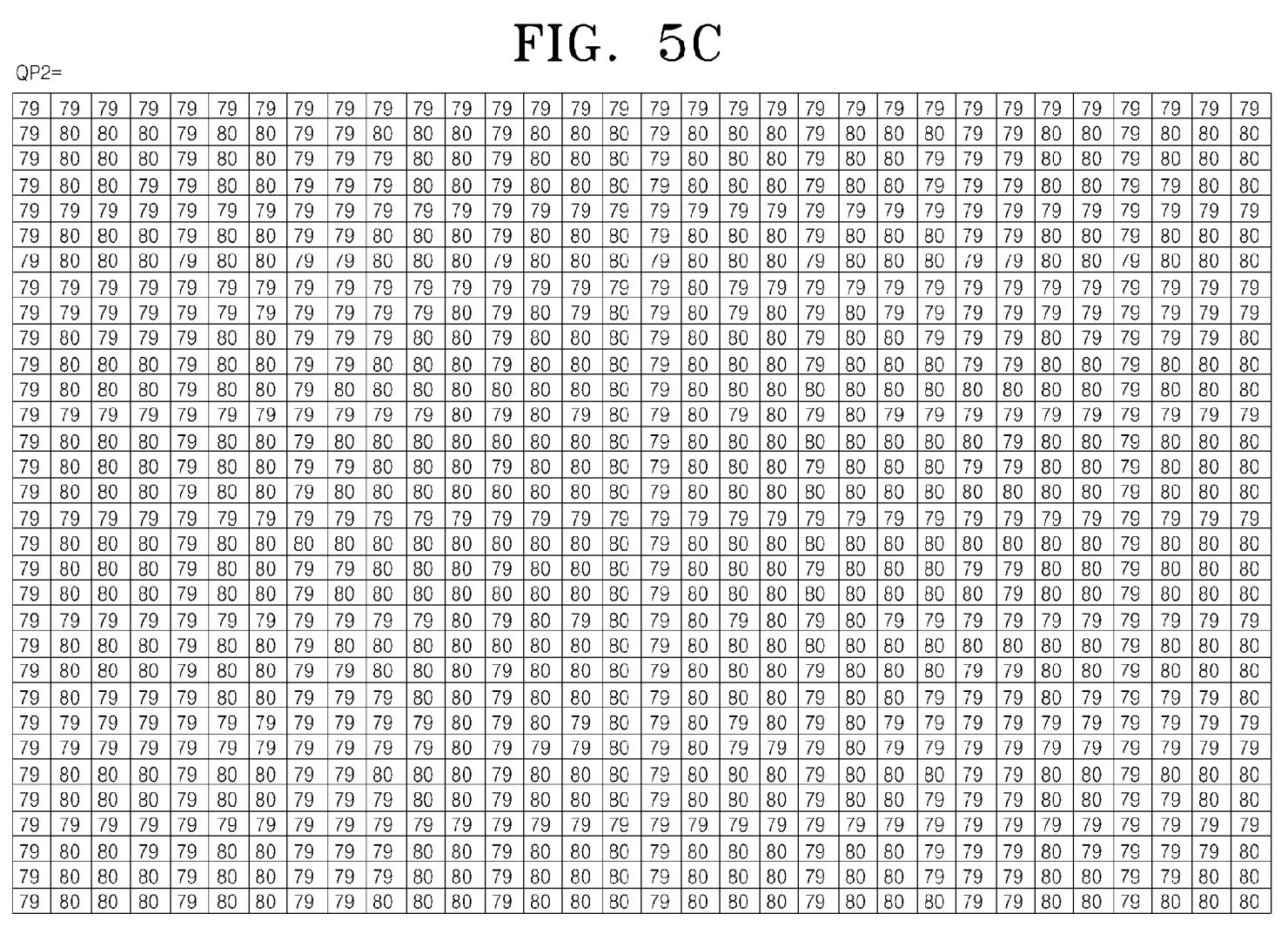
Figure 5D:
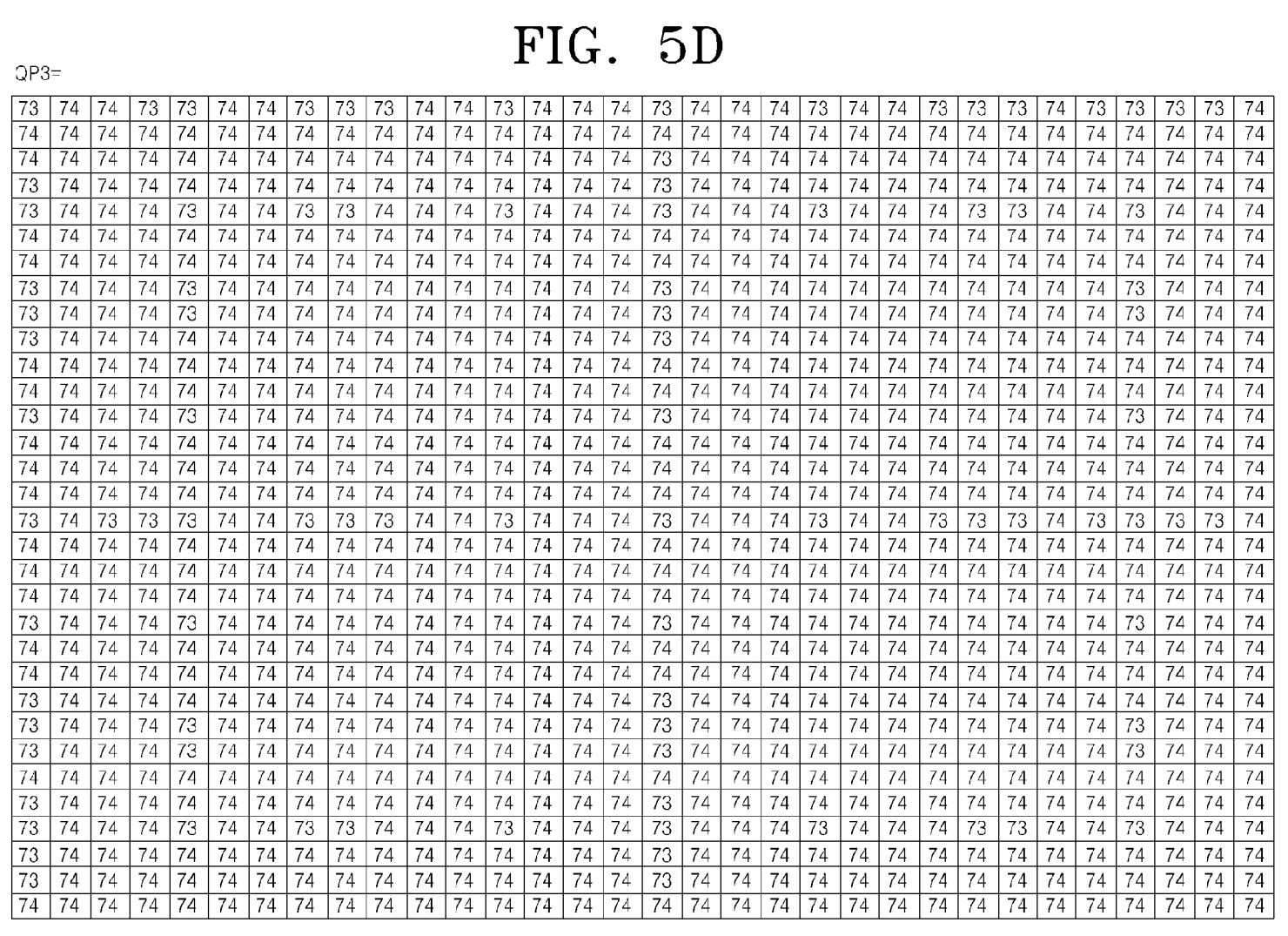
Figure 5E:
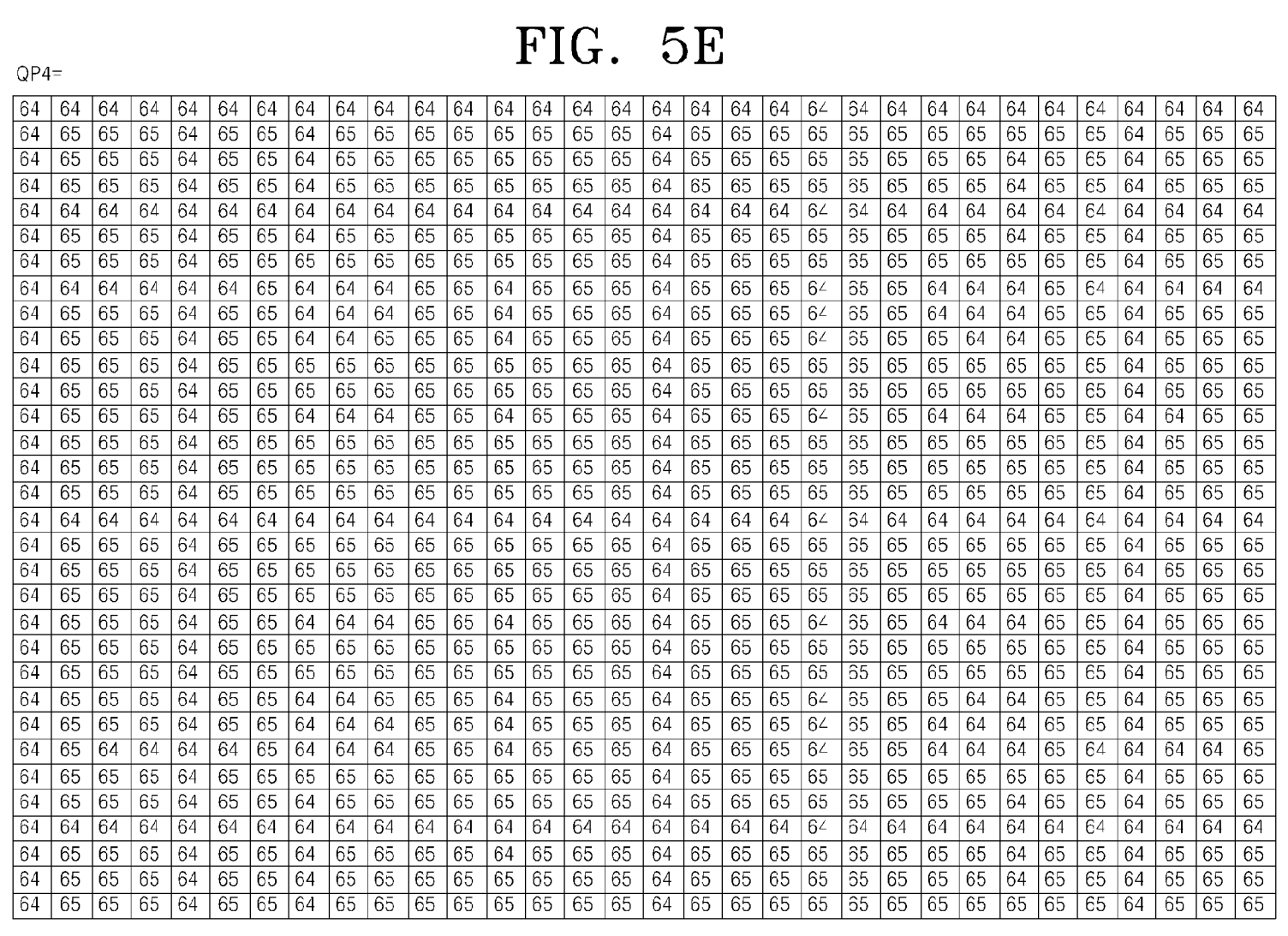
Figure 5F:
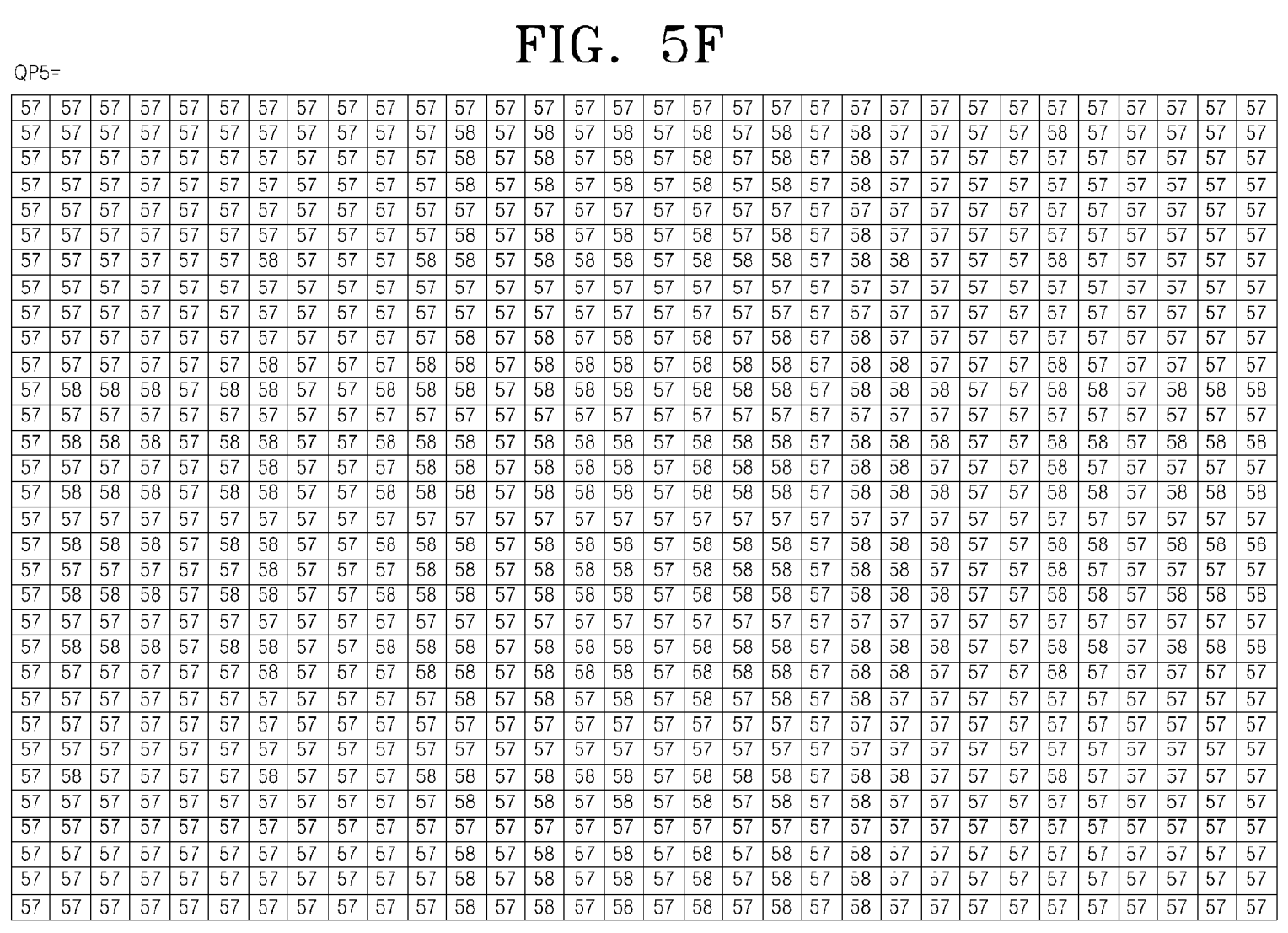

FIGS. 5A, 5B, 5C, 5D, 5E, and 5F illustrate scaling matrices based on quantization parameters for use in performing a transformation with respect to a 32×32 block, according to an exemplary embodiment;

FIGS. 6A, 6B, 6C, 6D, 6E, and 6F illustrate de-scaling matrices based on quantization parameters applied to a 16×16 block, according to an exemplary embodiment;

Figure 7A:
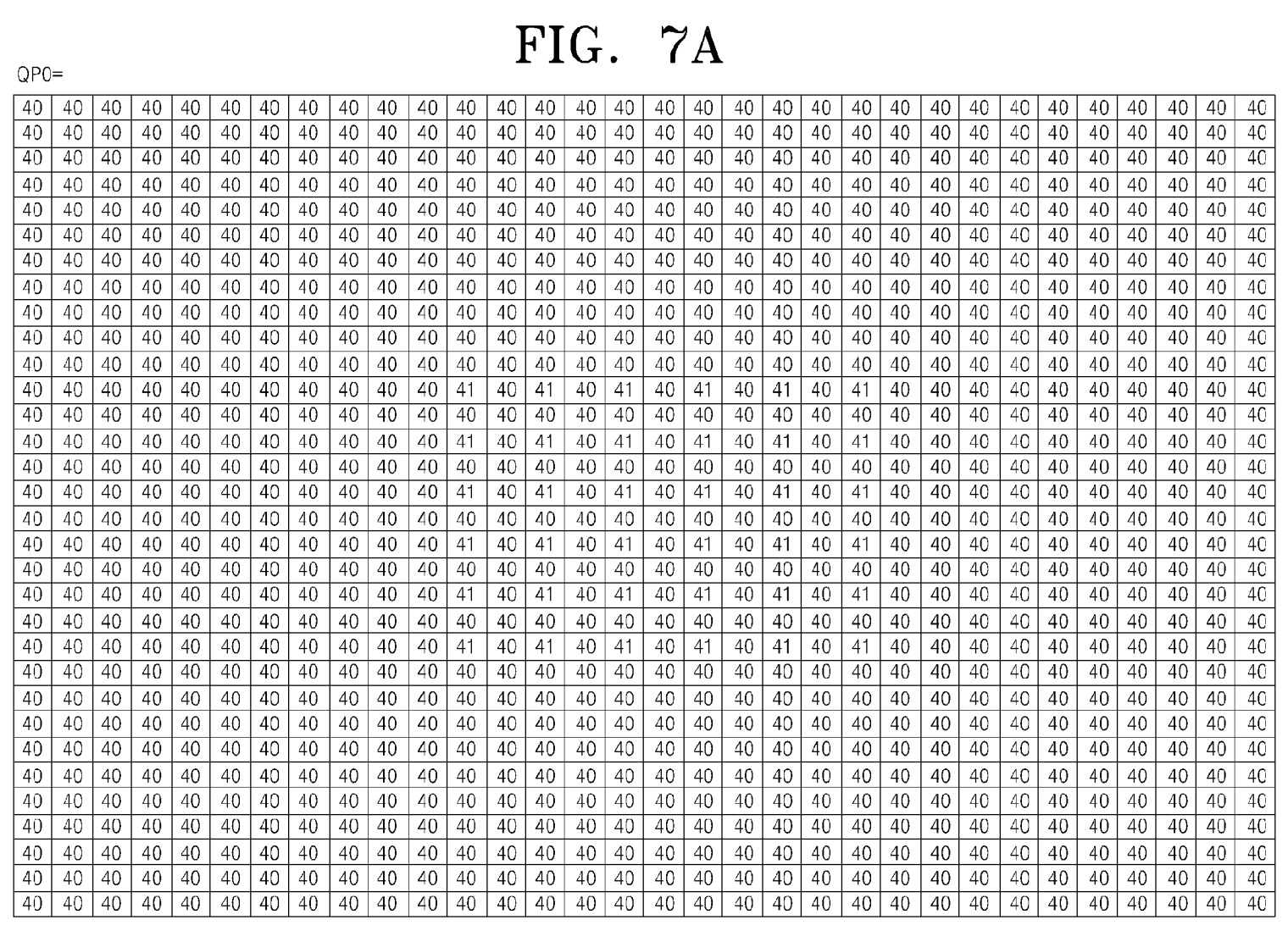
Figure 7B:
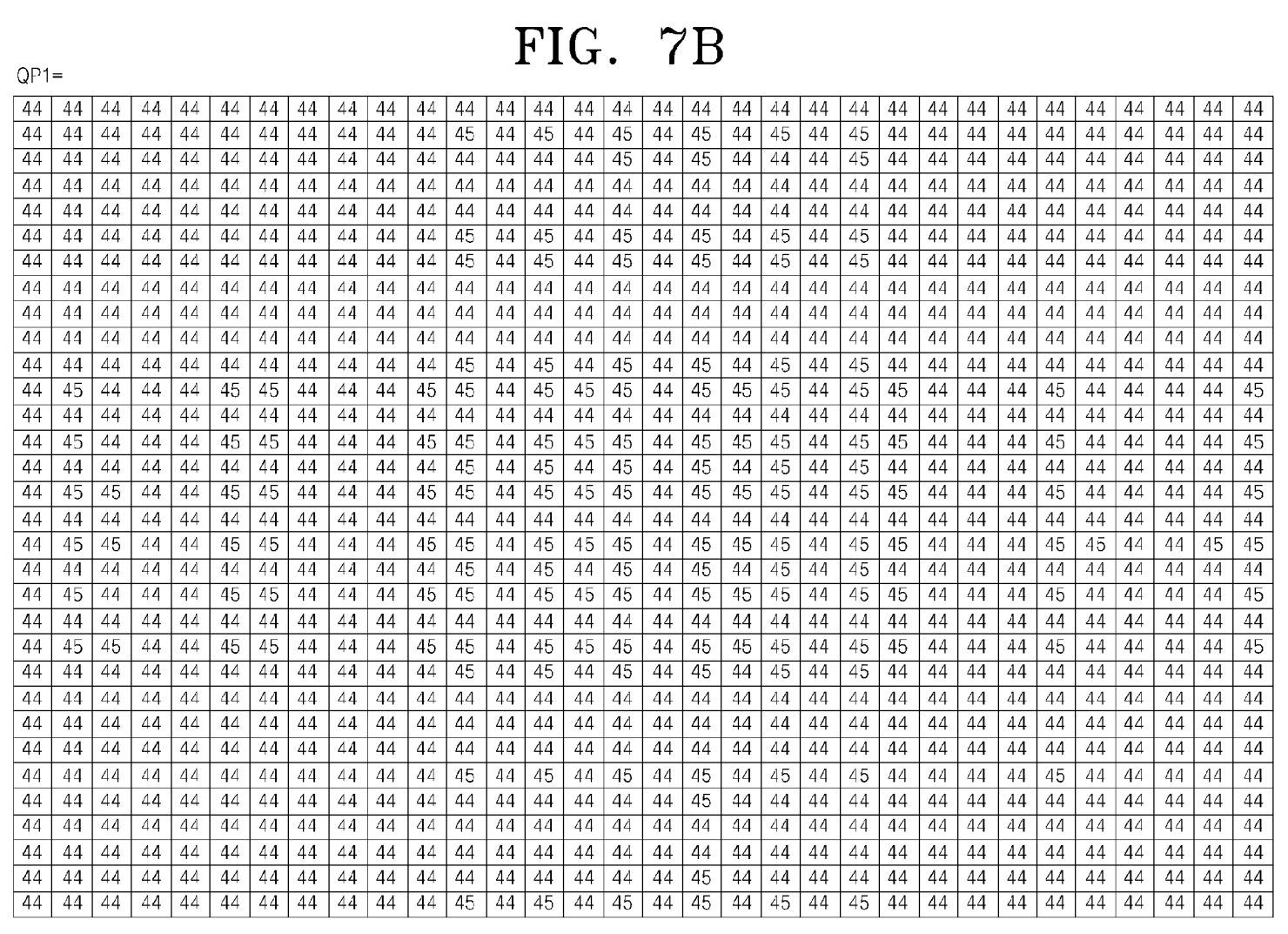
Figure 7C:
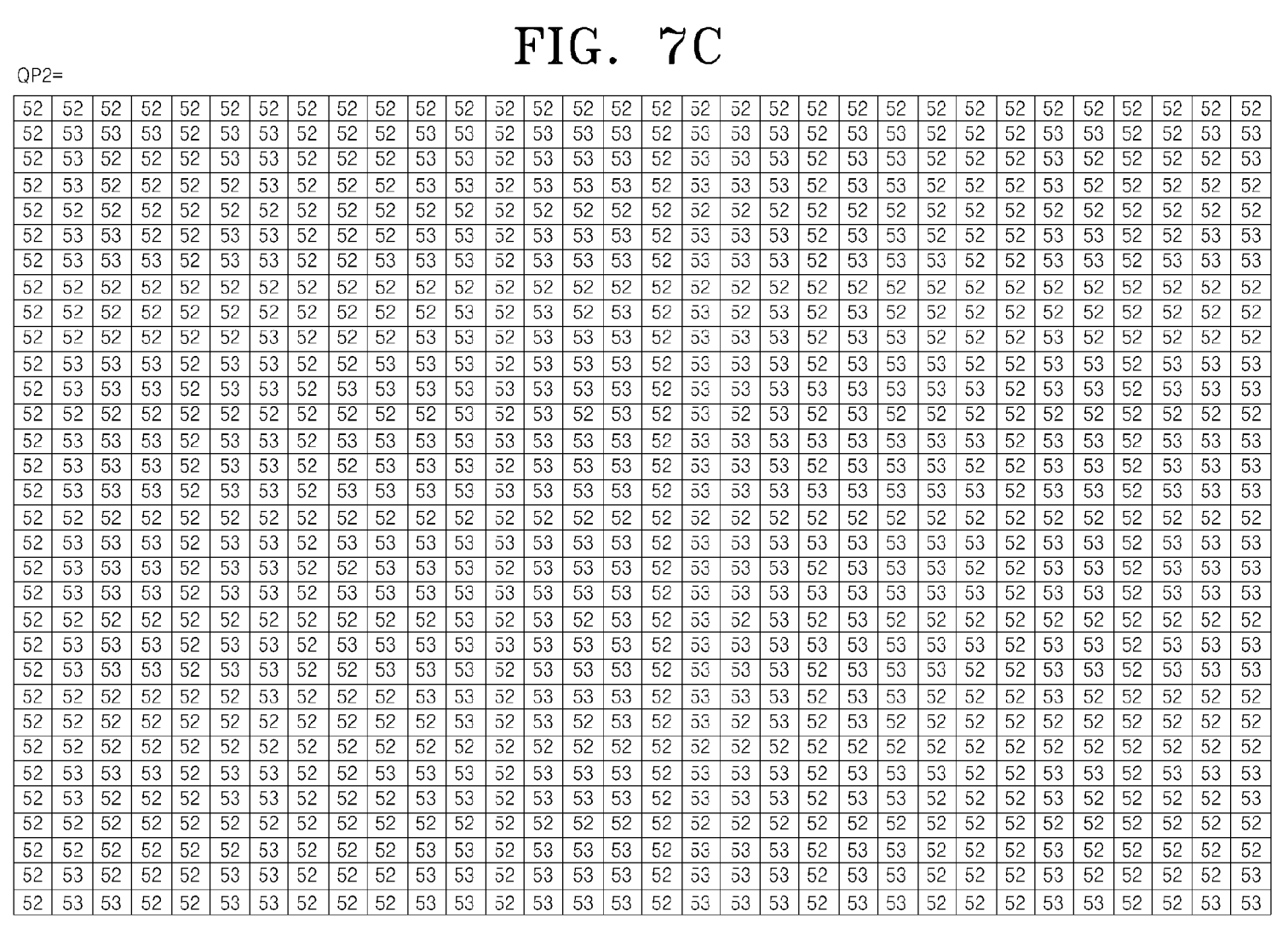
Figure 7D:
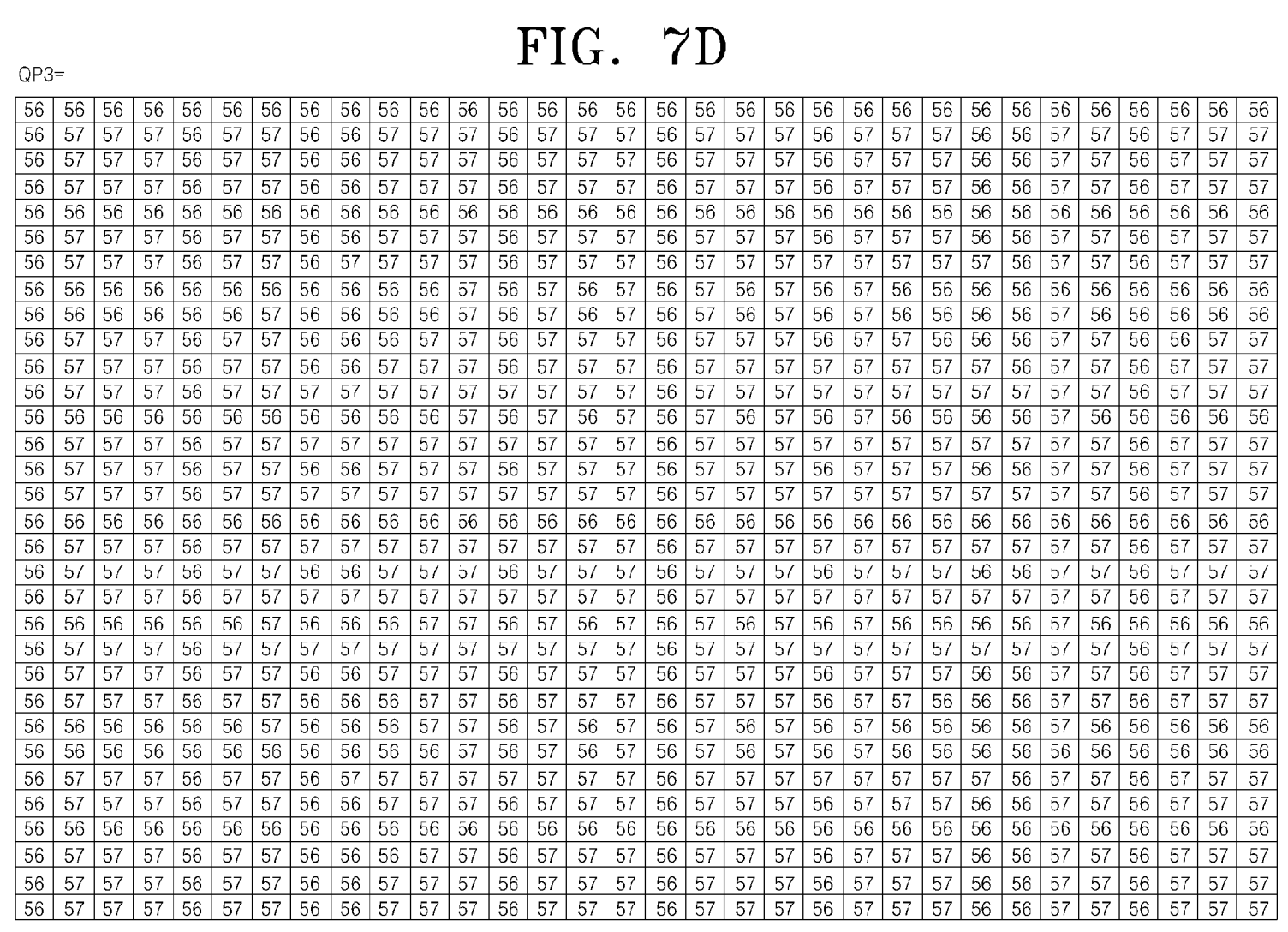
Figure 7E:
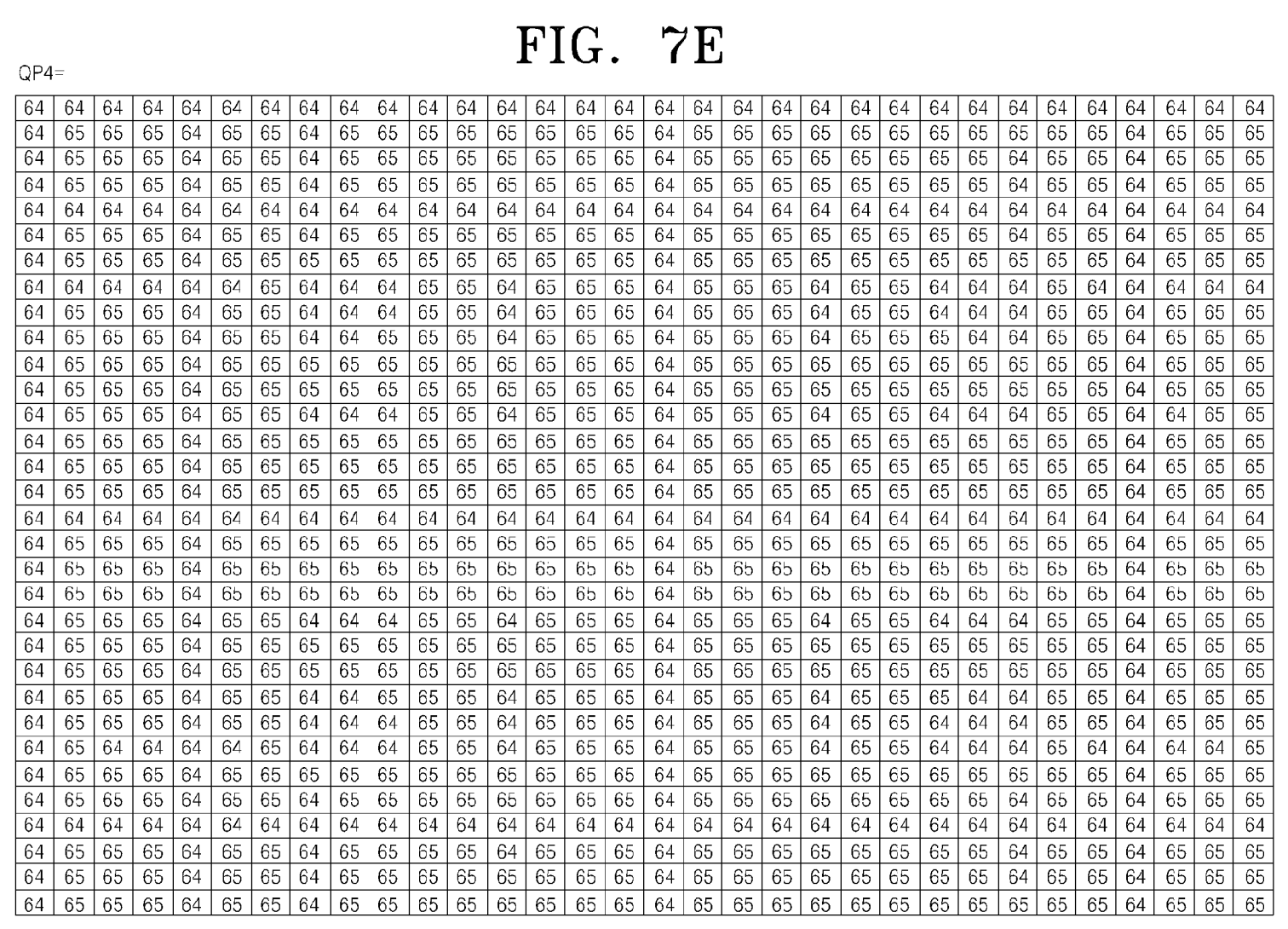
Figure 7F:
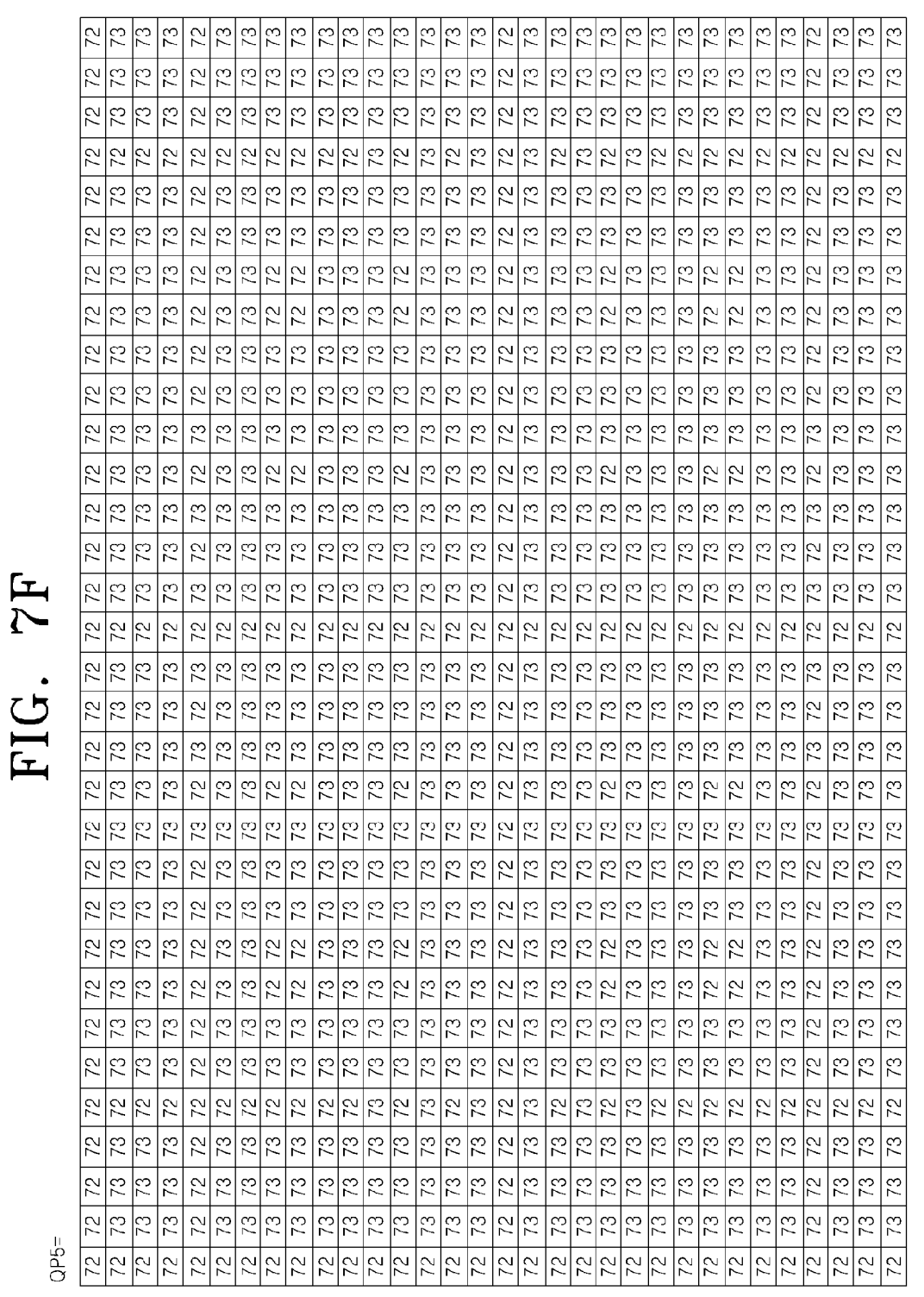

FIGS. 7A, 7B, 7C, 7D, 7E, and 7F illustrate de-scaling matrices based on quantization parameters applied to a 32×32 block, according to an exemplary embodiment;

FIG. 9 is a reference diagram which illustrates an operation process of a butterfly structure which forms the 32-point DCT of FIG. 8;

FIG. 10 is a flowchart which illustrates a video encoding method, according to an exemplary embodiment;

SUMMARY

According to an aspect of one or more exemplary embodiments, there is provided a video encoding method comprising: producing a fast transform matrix based on a first transform matrix which is used for performing a frequency transformation on a block which has a predetermined size; producing a transformed block by transforming the block which has the predetermined size by using the fast transform matrix; and performing scaling with respect to the transformed block in order to correct a difference between the first transform matrix and the fast transform matrix.

According to an aspect of one or more exemplary embodiments, there is provided a video encoding apparatus, including: a transformer which produces a fast transform matrix based on a first transform matrix which is used for performing a frequency transformation on a block which has a predetermined size and produces a transformed block by transforming the block which has the predetermined size by using the fast transform matrix; and a quantizer which performs scaling with respect to the transformed block in order to correct a difference between the first transform matrix and the fast transform matrix.

According to an aspect of one or more exemplary embodiments, there is provided a video decoding method comprising: receiving a quantized transformed block which has a predetermined size; performing descaling with respect to the quantized transformed block in order to correct a difference between a first inverse-transform matrix which is used for performing a frequency inverse-transformation on the quantized transformed block and a fast inverse-transform matrix which is produced based on the first inverse-transform matrix; and producing an inversely-transformed block by inversely transforming a descaled transformed block which is obtained by the descaling by using the fast inverse-transform matrix.

According to an aspect of one or more exemplary embodiments, there is provided a video decoding apparatus, including: a dequantizer which performs descaling with respect to a quantized transformed block in order to correct a difference between a first inverse-transform matrix which is used for performing a frequency inverse-transformation on the quantized transformed block and a fast inverse-transform matrix which is produced based on the first inverse-transform matrix; and an inverse-transformer which produces an inversely-transformed block by inversely transforming a descaled transformed block which is obtained by the descaling by using the fast inverse-transform matrix.

DETAILED DESCRIPTION

Hereinafter, exemplary embodiments will be described more fully with reference to the accompanying drawings.

Figure 1:
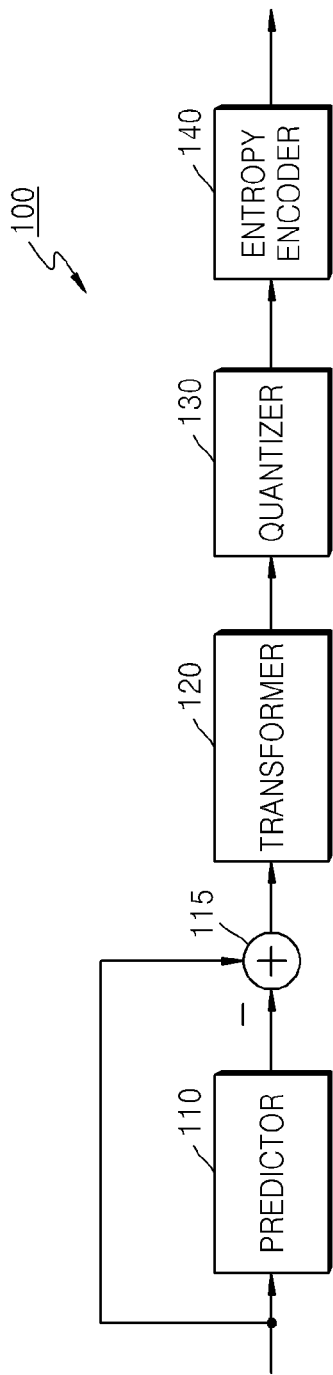
FIG. 1 is a block diagram of a video encoding apparatus, according to an exemplary embodiment.

FIG. 1 is a block diagram of a video encoding apparatus 100, according to an exemplary embodiment.

Referring to FIG. 1, the video encoding apparatus 100 includes a predictor 110, a subtracter 115, a transformer 120, a quantizer 130, and an entropy encoder 140.

The predictor 110 divides an input image into blocks, each of which has a respective predetermined size, and generates a prediction block by performing inter prediction or intra prediction on each block. In detail, the predictor 110 performs inter prediction for generating a prediction block by using at least one of a motion prediction process and a compensation process, which processes generate a motion vector which indicates a region which is similar to a current block within a predetermined search range of a reference picture that has previously been encoded and then restored, and intra prediction for generating a prediction block by using data of an adjacent block that is adjacent to a current block.

The subtracter 115 generates a residual by subtracting the prediction block of the current block from original image data.

The transformer 120 transforms the residual to a frequency domain. Specifically, in exemplary embodiments, a discrete cosine transform (DCT) matrix which is defined with respect to an existing block having a relatively small size, such as a 4×4 block or an 8×8 block, may be enlarged and may be applied to a block having a size of at least 16×16. As is described below, the transformer 120 performs a DCT according to additions and subtractions based on an integer and a shift operation, instead of using a floating point operation, by substituting elements of a transformation matrix which is used for an existing DCT with rational numbers, thereby reducing a calculation complexity while increasing an operation speed. According to another exemplary embodiment, the transformer 120 may perform a DCT by using a fast transformation matrix which includes elements that are obtained by multiplying the elements of a transformation matrix used for performing DCT by a power of 2 and then rounding up each of the multiplied elements to a respective nearest integer, thereby reducing overall calculation complexity.

The quantizer 130 quantizes the transformed residual. In particular, the quantizer 130 performs predetermined scaling so as to reduce an error value as between a result of the transformation performed using the fast transform matrix by the transformer 120 and a result of a transformation performed using a DCT matrix based on an actual floating point operation. Scaling and quantization will be described in detail below.

The entropy encoder 140 generates a bitstream by performing variable length encoding on quantized image data.

The transformation performed in the transformer 120 of FIG. 1 will now be described in detail.

The transformer 120 performs a column-wise transform and a row-wise transform with respect to an N×N (where N denotes an integer) input block in order to produce an N×N transformed block. When the N×N input block is referred to as Input, a row-wise DCT matrix is referred to as Transform_hor, a column-wise DCT matrix is referred to as Transform_ver, and a transform result value is referred to as Output, the transformer 120 performs a matrix operation as expressed in the following Equation: Output=Transform_hor×Input×Transform_ver, and then the transformer 120 outputs the transform result value Output. In the matrix operation, a first matrix multiplication Transform_hor×Input corresponds to an execution of a one-dimensional (1D) horizontal DCT with respect to each row of the N×N input block Input, and a multiplication of Transform_hor×Input by Transform_ver corresponds to an execution of a 1D vertical DCT with respect to each column of the N×N input block Input. The row-wise DCT matrix Transform_hor is the transpose of the column-wise DCT matrix Transform_ver. Although the below description is focused on an N×N transform matrix and an N×N inverse-transform matrix that respectively perform frequency transformation and frequency inverse-transformation with respect to the N×N input block, one or more exemplary embodiments may also be applied to the cases of using an axb (where a and b denote integers) frequency transform matrix and an axb frequency inverse-transform matrix.

When an element located at a (i,k) (where i and k are integers) position of a vertical transform matrix is referred to as Aik, the (i,k)th element Aik of the vertical transform matrix for transformation with respect to an N×N input block may be defined as in Equation 1:

$$A_{ik} = \alpha_i \cos\frac{\pi(2k+1)i}{2N} \quad \text{[Equation 1]}$$

$$\left(i, k = 0, \ldots, N-1, \alpha_0 = \sqrt{\frac{1}{N}}, \alpha_i = \sqrt{\frac{2}{N}}\right)$$

Because a horizontal transform matrix is the transpose of the corresponding vertical transform matrix, an (i,k)th element Bik of the corresponding horizontal transform matrix is expressible as a value which may be obtained by using a cosine function, similarly as with the vertical transform matrix. The transformer 120 may perform a DCT based on additions, subtractions, and a shift operation by using a fast transform matrix which is produced by substituting elements of a transformation matrix which is used for DCT with rational numbers. According to another exemplary embodiment, the transformer 120 may perform a DCT by using a fast transformation matrix which is formed of elements that are obtained by multiplying the elements of the transformation matrix used for DCT by a power of 2 and then rounding up each of the multiplied elements to a respective nearest integer.

Figure 2:
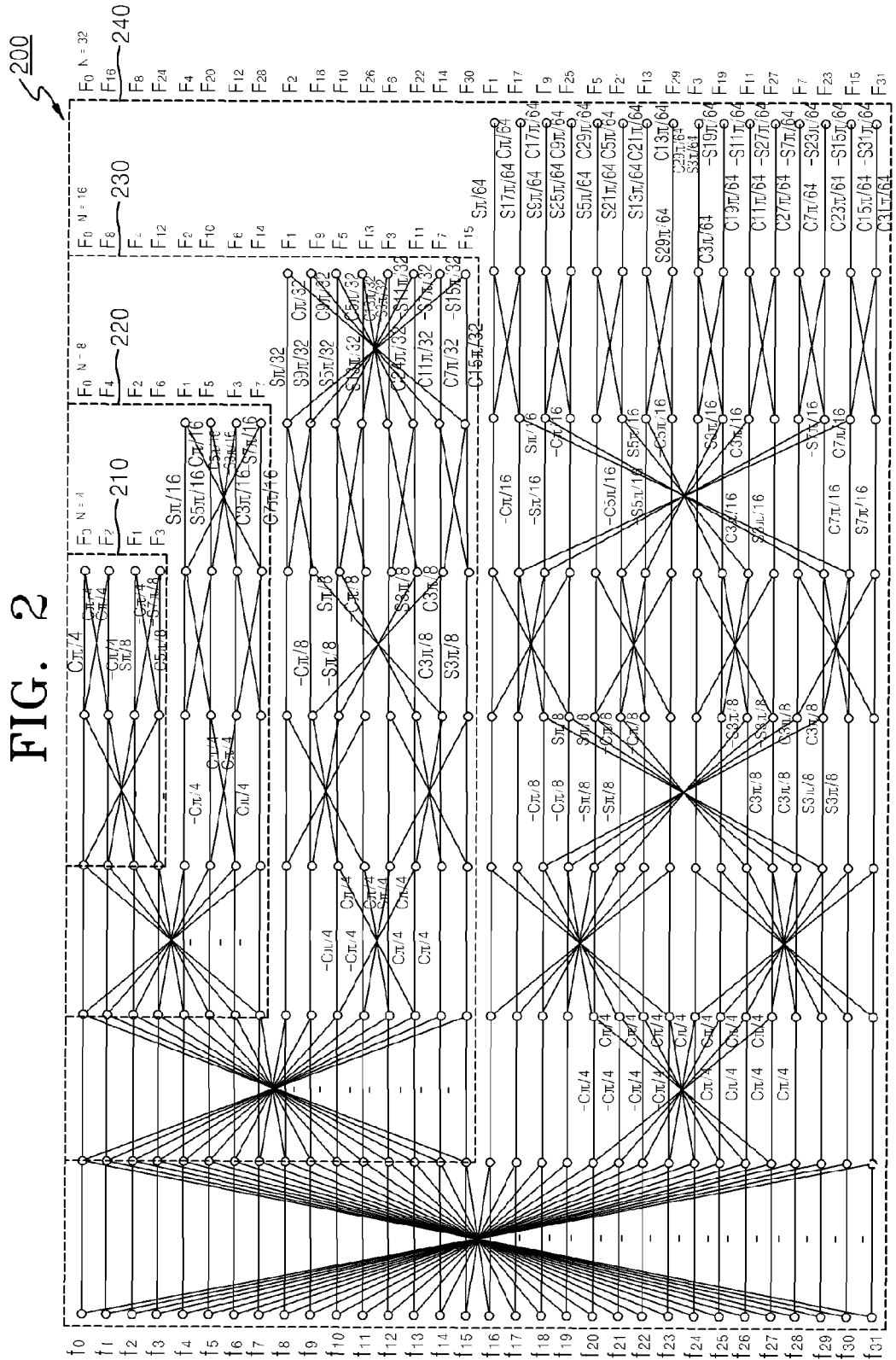
FIG. 2 is a flow graph of 4-point, 8-point, 16-point, and 32-point discrete cosine transform (DCT) operations, according to an exemplary embodiment.

FIG. 2 is a flow graph of 4-point, 8-point, 16-point, and 32-point DCT operations, according to an exemplary embodiment.

Referring to FIG. 2, f0 through f31 denote respective input values of one or more 1-dimensional (1D) DCTs and, at the same time, denote respective output values of one or more 1D inverse discrete cosine transforms (IDCTs). F0 through F31 denote respective output values of the one or more 1D DCTs and, at the same time, denote respective input values of the one or more 1D IDCTs. A data processing direction during a DCT operation is from left to right, and a processing direction during an IDCT is from right to left. Two lines intersecting at a point denotes an addition of two numbers. A value above each line denotes a multiplication according to a corresponding coefficient. c θ denotes cos θ, sθ denotes sin θ, and a negative sign (i.e., "−") denotes negation. A reference numeral 210 indicating a dashed line refers to a flow graph of a 4 point 1D DCT, a reference numeral 220 indicating a dashed line refers to a flow graph of an 8 point 1D DCT, a reference numeral 230 indicating a dashed line refers to a flow graph of a 16 point 1D DCT, and a reference numeral 240 indicating a dashed line refers to a flow graph of a 32 point 1D DCT.

As shown in the flow graph 200, cθ and sθ may become irrational numbers based on a corresponding value of θ in the DCT, and thus calculation complexity may increase.

Such a process of the DCT may increase complexity when realized using hardware. Accordingly, according to an exemplary embodiment, the transformer 120 produces a fast transform matrix which is similar to the original DCT matrix by substituting trigonometrical function values of each of the elements used for performing the DCT with rational numbers. According to another exemplary embodiment, the transformer 120 produces a fast transform matrix by multiplying each of the elements used for performing DCT by a predetermined constant, for example, $2^n$, and rounding up each of the multiplied elements to a respective nearest integer.

In detail, referring to FIG. 2, when N is equal to 16, that is, when a 1D DCT is performed with respect to a 16×16 input block, a 1D DCT is performed in units of 16 rows and 16 columns of the 16×16 input block based on the flow graph 230. When f=[f0, f1, f2, . . . , f14, f15]T denotes 16 input values, F=[F0, F1, F2, . . . , F14, F15]T denotes transform result values, and Original_A denotes a transform matrix representing a process for transforming the input values based on the flow graph 230, F=Original_A×f denotes the 1D DCT.

As described above, because cos θ and sin θ may be irrational numbers based on a value of θ, the transformer 120 substitutes cos θ and sin θ which are included in the elements of the transform matrix Original_A with rational numbers. For example, when N=16, the transformer 120 substitutes cos 0 with a0, cos(π×(½)/16) with a1, cos(π×(2/2)/16) with a2, cos(π×(3/2)/16) with a3, cos(π×(4/2)/16) with a4, cos(π×(5/2)/16) with a5, cos(π×(6/2)/16) with a6, cos(π×(7/2)/16) with a7, cos(π×(8/2)/16) with a8, cos(π×(9/2)/16) with a9, cos(π×(10/2)/16) with a10, cos(π×(11/2)/16) with a11, cos(π×(12/2)/16) with a12, cos(π×(13/2)/16) with a13, cos(π×(14/2)/16) with a14, and cos(π×(15/2)/16) with a15. Similarly, sin θ may be substituted with variables ai by using a relationship such as sin θ=cos(90−θ). The variables ai may be rational numbers, and a denominator of each variable ai may have a value which is equal to a power of 2 and which is capable of a shift operation. The variable ai is limited to a dyadic rational, because if the denominator is equal to a power of 2, a division operation or the like which is necessary for transformation may be substituted with a right shift operation (>>).

For example, when N is equal to 16, 16 variables ai may have the following values: a1=63/64, a2=62/64, a3=61/64, a4=59/64, a5=56/64, a6=53/64, a7=49/64, a8=45/64, a9=40/64, a10=35/64, a11=30/64, a12=24/64, a13=18/64, a14=12/64, and a15=6/64.

If N is equal to 16, a 1D DCT which is performed with respect to the 16×16 input block by using a substituted 16×16 transform matrix A may be expressed as the following operation, wherein Xi (where i denotes an integer within the range of 0 to 15) denotes an input value to be transformed, Bi, Ci, Di, Ei, and Fi denote intermediate values, and Yi denotes a transform result value:

```
{
/stage 0
 B0 = X0 + X15;B15 = X0 − X15;B1 = X1 + X14;B14 = X1 − X14;B2 = X2 +
X13;B13 = X2 − X13;B3 = X3 + X12;B12 = X3 − X12;B4 = X4 + X11;B11 = X4 − X11;B5 =
X5 + X10;B10 = X5 − X10;B6 = X6 + X9;B9 = X6 − X9;B7 = X7 + X8;B8 = X7 − X8;
 /stage 1
 C0 = B0 + B7;C7 = B0 − B7;C1 = B1 + B6;C6 = B1 − B6;C2 = B2 + B5;C5 = B2 −
B5;C3 = B3 + B4;C4 = B3 − B4;C10 = ( 45 * ( B13 − B10 ) ) >> 6;C13 = ( 45 * ( B13 +
```

-continued

```
B10 ) ) >> 6;C11 = ( 45 * ( B12 - B11 ) ) >> 6;C12 = ( 45 * ( B12 + B11 ) ) >> 6;
    /stage 2
    D0 = C0 + C3;D3 = C0 - C3;D8 = B8 + C11;D11 = B8 - C11;D12 = B15 -
C12;D15 = B15 + C12;D1 = C1 + C2;D2 = C1 - C2;D9 = B9 + C10;D10 = B9 - C10;D13 =
B14 - C13;D14 = B14 + C13;D5 = ( 45 * ( C6 - C5 ) ) >> 6;D6 = ( 45 * ( C6 + C5 ) ) >> 6;
    /stage 3
    Y0 = ( 45 * ( D0 + D1 ) ) >> 6;Y8 = ( 45 * ( D0 - D1 ) ) >> 6;Y4 = ( 59 * D3 + 24 *
D2 ) >> 6;Y12 = ( 24 * D3 - 59 * D2 ) >> 6;E4 = C4 + D5;E5 = C4 - D5;E6 = C7 - D6;E7 =
C7 + D6;E9 = ( 24 * D14 - 59 * D9 ) >> 6;E10 = (-59 * D13 - 24 * D10 ) >> 6;E13 =
( 24 * D13 - 59 * D10 ) >> 6;E14 = ( 59 * D14 + 24 * D9 ) >> 6;
    /stage 4
    Y2 = ( 12 * E4 + 62 * E7) >> 6;Y10 = ( 53 * E5 + 35 * E6 ) >> 6;Y6 = ( 53 * E6 -
35 * E5 ) >> 6;Y14 = ( 12 * E7 - 62 * E4 ) >> 6;F8 = D8 + E9;F9 = D8 - E9;F10 = D11 -
E10;F11 = D11 + E10;F12 = D12 + E13;F13 = D12 - E13;F14 = D15 - E14;F15 = D15 +
E14;
    /stage 5
    Y1 = ( 6 * F8 + 63 * F15 ) >> 6;Y9 = ( 49 * F9 + 40 * F14 ) >> 6;Y5 = ( 30 * F10 +
56 * F13 ) >> 6;Y13 = ( 61 * F11 + 18 * F12 ) >> 6;Y3 = ( 61 * F12 - 18 * F11 ) >> 6;Y11 =
( 30 * F13 - 56 * F10) >> 6;Y7 = ( 49 * F14 - 40 * F9 ) >> 6;Y15 = ( 6 * F15 - 63 * F8 ) >> 6;
}
```

As another example, if N is equal to 32, similarly as when N is equal to 16, a fast transform matrix A may be produced by substituting the elements constituting a 32×32 transform matrix Original_A for use in 1D DCT with respect to a 32×32 block with values based on 32 variables ai (where i denotes an integer within the range of 0 to 31). Referring back to FIG. 2, when N is equal to 32, that is, when a 1D DCT is performed with respect to a 32×32 input block, the 1D DCT is performed in units of 32 rows and 32 columns of the 32×32 input block based on the flow graph 240. When f=[f0, f1, f2, . . . , f30, f31]T denotes 32 input values, F=[F0, F1, F2, . . . , F30, F31]T denotes transform result values, and Original_A denotes a transform matrix representing a process for transforming the input values based on the flow graph 240, the 1D DCT may be expressed as F=Original_Axf. The transformer 120 produces the fast transform matrix A by substituting a component $\cos(\pi \times (i/2)/32)$ (where i denotes an integer from 0 to 31) of each of the elements constituting the 32×32 transform matrix Original_A with 32 variables ai that are rational numbers.

When N is equal to 32, 32 variables ai may have the following values; a1=255/256, a2=254/256, a3=253/256, a4=251/256, a5=248/256, a6=244/256, a7=241/256, a8=236/256, a9=231/256, a10=225/256, a11=219/256, a12=212/256, a13=205/256, a14=197/256, a15=189/256, a16=181/256, a17=171/256, a18=162/256, a19=152/256, a20=142/256, a21=131/256, a22=120/256, a23=109/256, a24=97/256, a25=86/256, a26=74/256, a27=62/256, a28=49/256, a29=37/256, a30=25/256, and a31=12/256.

When N is equal to 32, a 1D DCT which is performed on a 32×32 input block by using the fast transform matrix A may be expressed as the following operation, wherein Xi (where i denotes an integer in the range of 0 to 31) denotes an input value to be transformed, Ai, Bi, Ci, Di, Ei, and Fi denote intermediate values, and Yi denotes a transform result value:

```
{
    /stage 0
    A0 = X0 + X31;A31 = X0 - X31;A1 = X1 + X30;A30 = X1 - X30;A2 = X2 +
X29;A29 = X2 - X29;A3 = X3 + X28;A28 = X3 - X28;A4 = X4 + X27;A27 = X4 - X27;A5 =
X5 + X26;A26 = X5 - X26;A6 = X6 + X25;A25 = X6 - X25;A7 = X7 + X24;A24 = X7 -
X24;A8 = X8 + X23;A23 = X8 - X23;A9 = X9 + X22;A22 = X9 - X22;A10 = X10 +
X21;A21 = X10 - X21;A11 = X11 + X20;A20 = X11 - X20;A12 = X12 + X19;A19 = X12 -
X19;A13 = X13 + X18;A18 = X13 - X18;A14 = X14 + X17;A17 = X14 - X17;A15 = X15 +
X16;A16 = X15 - X16;
    /stage 1
    B0 = A0 + A15;B15 = A0 - A15;B1 = A1 + A14;B14 = A1 - A14;B2 = A2 +
A13;B13 = A2 - A13;B3 = A3 + A12;B12 = A3 - A12;B4 = A4 + A11;B11 = A4 - A11;B5 =
A5 + A10;B10 = A5 - A10;B6 = A6 + A9;B9 = A6 - A9;B7 = A7 + A8;B8 = A7 - A8;B20 =
( 181*( A27 - A20 ) ) >> 8;B27 = ( 181*( A27 + A20 ) ) >> 8;B21 = ( 181*( A26 - A21 ) ) >>
8;B26 = ( 181*( A26 + A21 ) ) >> 8;B22 = ( 181*( A25 - A22 ) ) >> 8;B25 =
( 181*( A25 + A22 ) ) >> 8;B23 = ( 181*( A24 - A23 ) ) >> 8;B24 = ( 181*( A24 + A23 ) ) >> 8;
    /stage 2
    C0 = B0 + B7;C7 = B0 - B7;C1 = B1 + B6;C6 = B1 - B6;C2 = B2 + B5;C5 = B2 -
B5;C3 = B3 + B4;C4 = B3 - B4;C10 = ( 181*( B13 - B10 ) ) >> 8;C13 = ( 181*( B13 +
B10 ) ) >> 8;C11 = ( 181*( B12 - B11 ) ) >> 8;C12 = ( 181*( B12 + B11 ) ) >> 8;C16 =
A16 + B23;C23 = A16 - B23;C24 = A31 - B24;C31 = A31 + B24;C17 = A17 + B22;C22 =
A17 - B22;C25 = A30 - B25;C30 = A30 + B25;C18 = A18 + B21;C21 = A18 - B21;C26 =
A29 - B26;C29 = A29 + B26;C19 = A19 + B20;C20 = A19 - B20;C27 = A28 - B27;C28 =
A28 + B27;
    /stage 3
    D0 = C0 + C3;D3 = C0 - C3;D8 = B8 + C11;D11 = B8 - C11;D12 = B15 -
C12;D15 = B15 + C12;D1 = C1 + C2;D2 = C1 - C2;D9 = B9 + C10;D10 = B9 - C10;D13 =
B14 - C13;D14 = B14 + C13;D5 = ( 181*( C6 - C5 ) ) >> 8;D6 = ( 181*( C6 + C5 ) ) >>
8;D18 = ( 97*C29 - 236*C18 ) >> 8;D20 = ( - 236*C27 - 97*C20 ) >> 8;D26 = (- 236*C21 +
97*C26 ) >> 8;D28 = ( 97*C19 + 236*C28 ) >> 8;D19 = ( 97*C28 - 236*C19 ) >>
8;D21 = (- 236*C26 - 97*C21 ) >> 8;D27 = ( - 236*C20 + 97*C27 ) >> 8;D29 = ( 97*C18 +
236*C29 ) >> 8;
```

-continued

```
/stage 4
    Y0 = ( 181*( D0 + D1 ) ) >> 8;Y16 = ( 181*( D0 - D1 ) ) >> 8;Y8 = ( 236*D3 +
97*D2 ) >> 8;Y24 = ( 97*D3 - 236*D2 ) >> 8;E4 = C4 + D5;E5 = C4 - D5;E6 = C7 -
D6;E7 = C7 + D6;E9 = ( 97*D14 - 236*D9 ) >> 8;E10 = (-236*D13 - 97*D10 ) >> 8;E13 =
(97*D13 - 236*D10 ) >> 8;E14 = ( 236*D14 + 97*D9 ) >> 8;E16 = C16 + D19;E19 = C16 -
D19;E20 = C23 - D20;E23 = C23 + D20;E24 = C24 + D27;E27 = C24 - D27;E28 = C31 -
D28;E31 = C31 + D28;E17 = C17 + D18;E18 = C17 - D18;E21 = C22 - D21;E22 = C22 +
D21;E25 = C25 + D26;E26 = C25 - D26;E29 = C30 - D29;E30 = C30 + D29;
    /stage 5
    Y4 = ( 49*E4 + 251*E7 ) >> 8;Y20 = ( 212*E5 + 142*E6 ) >> 8;Y12 = ( 212*E6 -
142*E5 ) >> 8;Y28 = ( 49*E7 - 251*E4 ) >> 8;F8 = D8 + E9;F9 = D8 - E9;F10 = D11 -
E10;F11 = D11 + E10;F12 = D12 + E13;F13 = D12 - E13;F14 = D15 - E14;F15 = D15 +
E14;F17 = ( 49*E30 - 251*E17 ) >> 8;F18 = ( - 251*E29 - 49*E18 ) >> 8;F21 =
( 212*E26 - 142*E21 ) >> 8;F22 = ( - 142*E25 - 212*E22 ) >> 8;F25 = ( 212*E25 -
142*E22 ) >> 8;F26 = ( 142*E26 + 212*E21 ) >> 8;F29 = ( 49*E29 - 251*E18 ) >> 8;F30 =
( 251*E30 + 49*E17 ) >> 8;
    /stage 6
    Y2 = ( 25*F8 + 254*F15 ) >> 8;Y18 = ( 197*F9 + 162*F14 ) >> 8;Y10 = ( 120*F10 +
225*F13 ) >> 8;Y26 = ( 244*F11 + 74*F12 ) >> 8;Y6 = ( 244*F12 - 74*F11 ) >> 8;Y22 =
( 120*F13 - 225*F10 ) >> 8;Y14 = ( 197*F14 - 162*F9 ) >> 8;Y30 = ( 25*F15 - 254*F8 ) >>
8;G16 = E16 + F17;G17 = E16 - F17;G18 = E19 - F18;G19 = E19 + F18;G20 = E20+
F21;G21 = E20 - F21;G22 = E23 - F22;G23 = E23 + F22;G24 = E24 + F25;G25 = E24 -
F25;G26 = E27 - F26;G27 = E27 + F26;G28 = E28 + F29;G29 = E28 - F29;G30 = E31 -
F30;G31 = E31 + F30;
    /stage 7
    Y1 = ( 12*G16 + 255*G31 ) >> 8;Y17 = ( 189*G17 + 171*G30 ) >> 8;Y9 =
( 109*G18 + 231*G29 ) >> 8;Y25 = ( 241*G19 + 86*G28 ) >> 8;Y5 = ( 62*G20 +
248*G27 ) >> 8;Y21 = ( 219*G21 + 131*G26 ) >> 8;Y13 = ( 152*G22 + 205*G25 ) >>
8;Y29 = ( 253*G23 + 37*G24 ) >> 8;Y3 = ( 253*G24 - 37*G23 ) >> 8;Y19 = ( 152*G25 -
205*G22 ) >> 8;Y11 = ( 219*G26 - 131*G21 ) >> 8;Y27 = ( 62*G27 - 248*G20 ) >> 8;Y7 =
( 241*G28 - 86*G19 ) >> 8;Y23 = ( 109*G29 - 231*G18 ) >> 8;Y15 = ( 189*G30 -
171*G17 ) >> 8;Y31 = ( 12*G31 - 255*G16 ) >> 8;
    }
```

As described above, according to another exemplary embodiment, the transformer 120 produces a fast transform matrix by multiplying each of elements used for performing a DCT by $2^n$ and rounding up each of the multiplied elements to a respective nearest integer. In detail, the fast transform matrix A is produced by transforming the values of the elements of the DCT matrix Original_A based on the following equation: A=round(Original_A*$2^n$), representing an operation of multiplying the transform matrix Original_A for use in a 1D DCT by $2^n$ (where n is an integer) and then rounding up each element of the multiplied transform matrix Original_A to a respective nearest integer.

According to exemplary embodiments, because the transformer 120 performs a transformation by using the fast transform matrix A instead of the original N×N transform matrix Original_A, an error occurs as between a result value based on the original N×N transform matrix Original_A and a result value based on the substituted transform matrix A. Accordingly, according to an exemplary embodiment, this error may be reduced or minimized by performing scaling with respect to a transformed block in a quantization operation.

Figure 3:
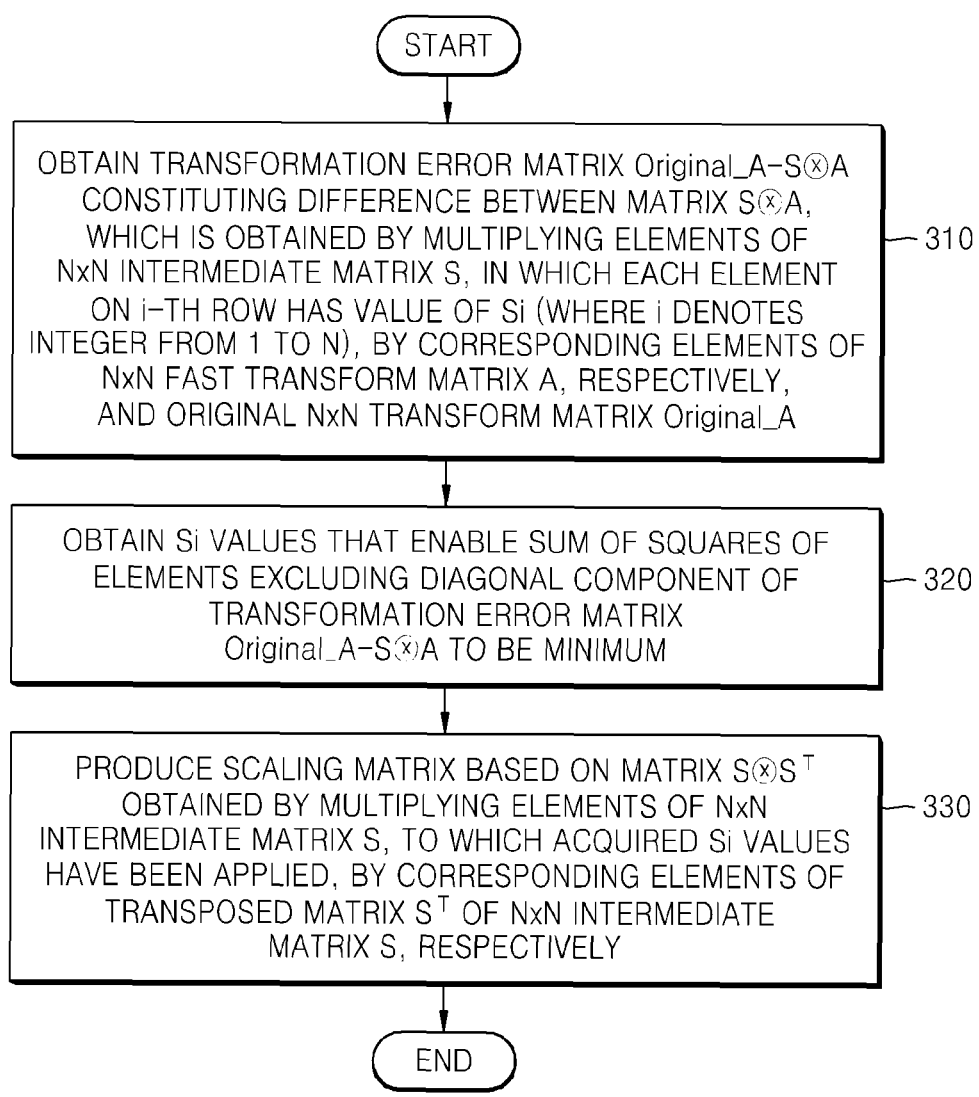
FIG. 3 is a flowchart which illustrates a method for producing a scaling matrix, according to an exemplary embodiment.

FIG. 3 is a flowchart which illustrates a method for producing a scaling matrix, according to an exemplary embodiment.

Referring to FIG. 3, in operation 310, a transformation error matrix Original_A-S□A constituting a difference between matrix S□A, which is obtained by multiplying the elements of an N×N intermediate matrix S, in which each element on an i-th row has a value of Si (where i denotes an integer from 1 to N), by corresponding elements of an N×N fast transform matrix A, respectively, and the original N×N transform matrix Original_A is obtained. □ indicates an element-by-element multiplication or element-wise multiplication, in which elements at corresponding locations in matrices are multiplied.

For example, a 16×16 intermediate matrix S is defined as follows:

$$S = \begin{pmatrix} S1 & S1 & \cdots & S1 & S1 \\ S2 & S2 & \cdots & S2 & S2 \\ \cdots & \cdots & \cdots & \cdots & \cdots \\ S16 & S16 & \cdots & S16 & S16 \end{pmatrix}$$

In operation 320, Si values that enable a sum of squares of elements excluding a diagonal component of the transformation error matrix Original_A-S□A to be a minimum are obtained. The Si values may be determined using any optimization algorithm. For example, the Si values may be determined by setting an initial value of S1 to be equal to ($\frac{1}{4}*2^{(1/2)}$) and then applying an optimization algorithm, such as, for example, a Nelder-Mead simplex method.

In operation 330, a scaling matrix is produced based on a matrix S□$S^T$ which is obtained by multiplying each of the elements of the N×N intermediate matrix S, to which the acquired Si values have been applied, by corresponding elements of a transposed matrix $S^T$ of the N×N intermediate matrix S, respectively.

When PF denotes the matrix S□$S^T$, a scaling matrix MF may be calculated according to the following equation: MF=PF*$2^m$/Qstep. Here, Qstep denotes a quantization step, and m is a positive integer.

FIGS. 4A, 4B, 4C, 4D, 4E, and 4F illustrate scaling matrices MF based on quantization parameters QP for use in performing a transformation with respect to a 16×16 block, according to an exemplary embodiment. FIGS. 4A, 4B, 4C, 4D, 4E, and 4F illustrate a case in which m is equal to 10 during calculation of a scaling matrix.

The scaling matrices MF, as shown in FIGS. 4A, 4B, 4C, 4D, 4E, and 4F, are defined with respect to Qstep values of 0.625, 0.6875, 0.8125, 0.875, 1, and 1.25 of only an initial six quantization steps, without having to be defined with respect to all quantization steps, because when the value of quantization parameter QP increases by 6, the quantization step Qstep is doubled, and thus the scaling matrices MF may be defined with respect to the Qstep values of the initial six quantization steps, and the scaling matrices MF based on the other quantization parameters QP may be selected based on a (QP mod 6) value. The scaling matrices MF of FIGS. 4A, 4B, 4C, 4D, 4E, and 4F are only exemplary embodiments, and each element of the scaling matrices MF may be adjusted within a range of ±1 or ±2.

Such a scaling matrix MF may be obtained for a 32×32 block in a similar manner as that described above for obtaining the scaling matrix MF for the 16×16 block. FIGS. 5A, 5B, 5C, 5D, 5E, and 5F illustrate scaling matrices MF based on a quantization parameter QP which is applied to a 32×32 block, which are obtained as above. The scaling matrices MF of FIGS. 5A, 5B, 5C, 5D, 5E, and 5F are only exemplary embodiments, and each element of the scaling matrices MF may be adjusted within a range of ±1 or ±2. According to an exemplary embodiment, a special scaling matrix MF is not applied to each block size, but six scaling matrices MF are set for only a block which has a predetermined size, based on the quantization parameter QP, and then a scaling matrix for a block which is either smaller than or larger than the block which has the predetermined size may be a scaling matrix MF which is obtained by increasing or decreasing the elements of the six scaling matrices MF which has been set for the block which has the predetermined size, based on a ratio between the sizes of the block which has the predetermined size and the smaller or larger block. For example, six scaling matrices MF may be set for an M×M block based on a quantization parameter, and then a scaling matrix which is obtained by multiplying each of the elements of the six scaling matrices MF set for the M×M block by M/N may be used as a scaling matrix for an N×N block. For example, when a scaling matrix MF is set for a 32×32 block, each of 2×2, 4×4, 8×8, and 16×16 blocks may use respective scaling matrices which are obtained by increasing each of the elements of the scaling matrix MF set for the 32×32 block by multiplying each element by 16, 8, 4, and 2, respectively. Similarly, when a scaling matrix MF is set for a 32×32 block, 64×64 and 128×128 blocks may use respective scaling matrices which are obtained by decreasing each of the elements of the scaling matrix MF set for the 32×32 block by multiplying each element by 0.5 and 0.25, respectively. As such, when a scaling matrix is set for only a block which has a predetermined size, and blocks of the other sizes use scaling matrices for which the values of corresponding elements have been increased or decreased based on size ratios as between the block which has the predetermined size and the blocks of the other sizes, quantization or dequantization may be performed based on an amount which corresponds to a ratio between the respective elements of scaling matrices set for different sizes of blocks in order to restore its original value. As described above, when a scaling matrix is set for only a block which has a predetermined size, and blocks of the other sizes use scaling matrices for which the values of corresponding elements have been increased or decreased based on size ratios as between the block which has the predetermined size and the blocks of the other sizes, an amount of memory which is required for storing a scaling matrix MF may be reduced.

As described above, the quantizer 130 performs scaling with respect to a transformed block by using a scaling matrix MF or a predetermined scaling constant in order to reduce an error value as between a result of the transformation which is performed by using the fast transform matrix A by the transformer 120 and a result of the transformation which is performed by using the DCT matrix Original_A based on an actual floating point operation. In detail, the quantizer 130 may perform scaling and quantization simultaneously with respect to a transformed block which corresponds to a result of the transformation on the N×N block by using the scaling matrix MF and a shift operation. The quantization is performed by performing a bit shift operation on a value which is obtained by multiplying the scaling matrix MF and the transformed block and then adding a predetermined offset to the value, by a q bit as expressed in the following equation: q=floor(QP/6)+m. When Zij denotes a quantized coefficient value, Wij denotes a transformation coefficient, and f denotes an offset, |Zij|=(|Wij|.MF+f)>>qbits and sign(|Zin|)=sign(|Wij|). Here, ".MF" denotes a vector product operation for multiplying the elements at corresponding locations in matrices. As described above, the vector product operation may be indicated as □.

Further, in a dequantization operation, dequantization may be performed by applying a descaling matrix and a shift operation in order to compensate for a difference between an original N×N inverse transform matrix Original_A-1 which is used for performing an IDCT, and an N×N fast inverse-transform matrix A-1.

According to an exemplary embodiment, a de-scaling matrix V may be generated based on a matrix PF which corresponds to the matrix S□$S^T$ which is obtained by multiplying each of the elements of the intermediate matrix S with the corresponding elements of the transposed matrix $S^T$, which are also used to generate the scaling matrix MF. In detail, when Qstep denotes a quantization step, PF denotes the matrix S□$S^T$, and n is a positive integer, the descaling matrix V may be obtained by using the following equation: V=Qstep*PF*$2^n$.

When the descaling matrix V is obtained as described above, descaling and dequantization may be performed by performing a bit shift operation on a value which is obtained by multiplying the descaling matrix V and a quantized transformation coefficient, by a floor(QP/6) bit, wherein floor[x] is a maximum integer which is smaller than or equal to x and QP denotes a quantization parameter. In particular, when Zij denotes a quantized coefficient value and Wij denotes a transformation coefficient, Wij may be obtained by dequantizing the quantized coefficient Zij via the following equation: Wij=(Zij)floor(QP/6). Here, ".V" denotes a vector product operation for multiplying each of the elements at corresponding locations in matrices. As described above, the vector product operation may be indicated as □.

FIGS. 6A, 6B, 6C, 6D, 6E, and 6F illustrate de-scaling matrices V based on AA quantization parameter QP as applied to a 16×16 block, according to an exemplary embodiment. In particular, FIGS. 6A, 6B, 6C, 6D, 6E, and 6F illustrate a case in which m is equal to 10 during calculation of a descaling matrix. The descaling matrices V may be defined with respect to 0.625, 0.6875, 0.8125, 0.875, 1, and 1.25, which are Qstep values of an initial six quantization steps, without having to be defined with respect to all quantization steps Qstep, similarly as described above with respect to the scaling matrices MF of FIGS. 4A, 4B, 4C, 4D, 4E, and 4F. The descaling matrices V based on other quantization parameters QP may be selected based on a (QP mod 6) value. The descaling matrices V of FIGS. 6A, 6B, 6C, 6D, 6E, and 6F are only exemplary embodiments, and each element of the descaling matrices V may be adjusted within a range of ±1 or ±2.

Similarly, descaling matrices V based on a quantization parameter QP which is applied to the 32×32 block may be obtained in a process similar to that described above with respect to the descaling matrices V as applied to the 16×16 block. FIGS. 7A, 7B, 7C, 7D, 7E, and 7F illustrate descaling matrices V based on a quantization parameter QP which is applied to a 32×32 block, according to an exemplary embodiment. The descaling matrices V of FIGS. 7A, 7B, 7C, 7D, 7E, and 7F are only exemplary embodiments, and each element of the descaling matrices V may be adjusted within a range of ±1 or ±2. According to an exemplary embodiment, a special descaling matrix V is not applied to each block size, but six descaling matrices V are set for only a block which has a predetermined size based on the quantization parameter QP, and then a descaling matrix for a block smaller than or larger than the block which has the predetermined size may be a descaling matrix V which is obtained by increasing or decreasing each of the elements of the six descaling matrices V which are set for the block which has a predetermined size based on a ratio between the sizes of the block which has the predetermined size and the smaller or larger block. For example, six descaling matrices V may be set for an M×M block based on a quantization parameter, and then a descaling matrix which is obtained by multiplying each of the elements of the six descaling matrices V set for the M×M block by M/N may be used as a descaling matrix for an N×N block. For example, when a descaling matrix V is set for a 32×32 block, each of 2×2, 4×4, 8×8, and 16×16 blocks may use respective descaling matrices which are obtained by increasing each of the elements of the descaling matrix V set for the 32×32 block by multiplying each element by 16, 8, 4, and 2, respectively. Similarly, when a descaling matrix V is set for a 32×32 block, 64×64 and 128×128 blocks may use respective descaling matrices which are obtained by decreasing each of the elements of the descaling matrix V set for the 32×32 block by multiplying each element by 0.5 and 0.25, respectively. As such, when a descaling matrix is set for only a block which has a predetermined size, and blocks of the other sizes use descaling matrices for which the values of the corresponding elements have been increased or decreased based on size ratios as between the block which has the predetermined size and the blocks of the other sizes, quantization or dequantization may be performed based on an amount which corresponds to a ratio between the respective elements of descaling matrices set for different sizes of blocks in order to restore its original value. As described above, when a descaling matrix is set for only a block which has a predetermined size, and blocks of the other sizes use descaling matrices for which the values of the corresponding elements have been increased or decreased based on size ratios as between the block which has the predetermined size and the blocks of the other sizes, an amount of memory which is required for storing a descaling matrix V may be reduced.

Figure 8:
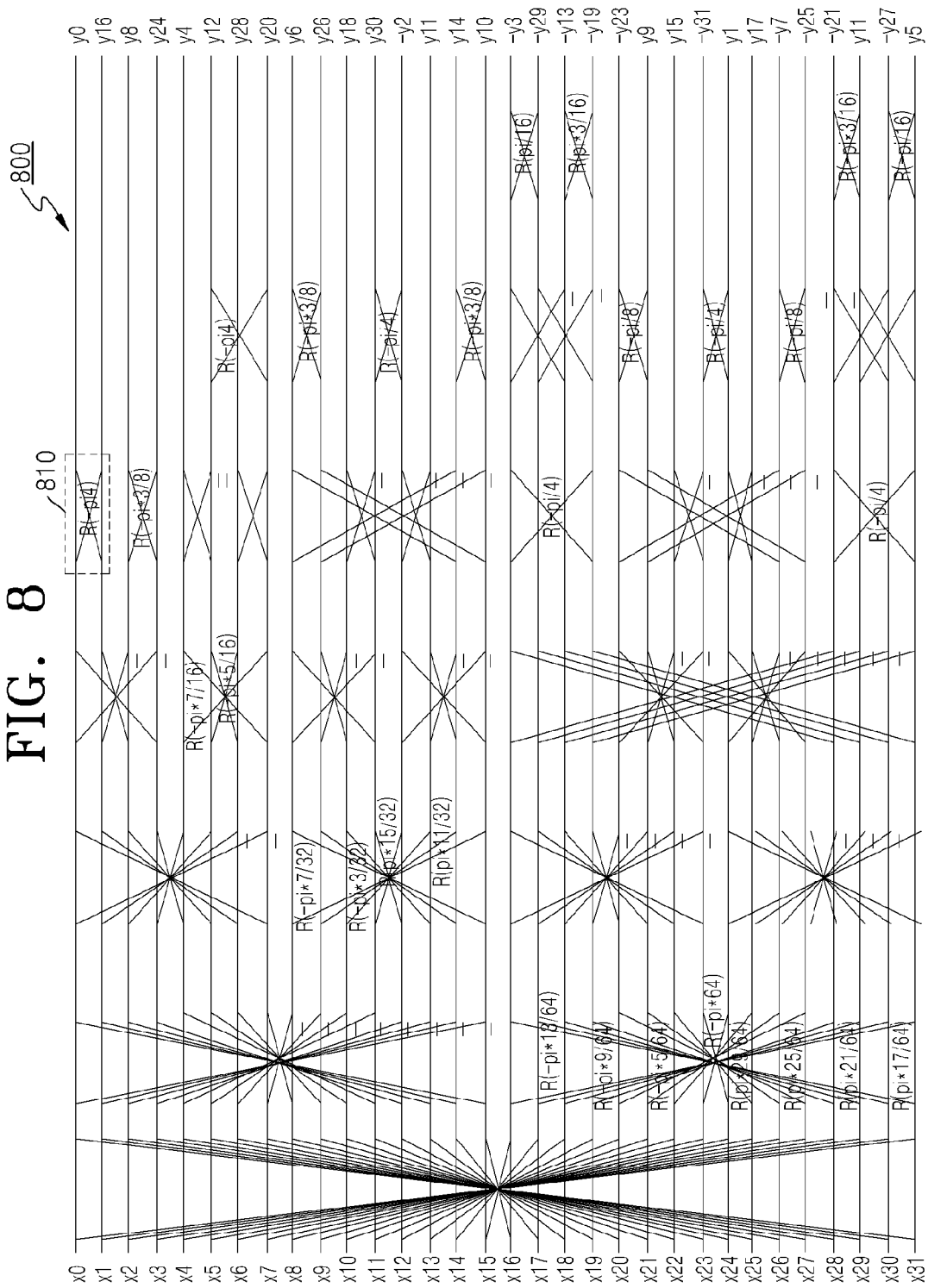
FIG. 8 is a flow graph of 32-point DCT operation, according to another exemplary embodiment.

FIG. 8 is a flow graph 800 of 32-point DCT operations, according to another exemplary embodiment.

Referring to FIG. 8, x0 through x31 denote input values, and y0 through y31 denote output values of a DCT. A data processing direction during transformation is from left to right, and a processing direction during inverse transformation is from right to left. Two lines intersecting at a point denotes an addition of two numbers, and a negative sign (i.e., "−") denotes a negation. A value R(θ) above each line denotes an operation process which is based on a butterfly structure as shown in FIG. 9.

FIG. 9 is a reference diagram which illustrates an operation process of a butterfly structure which forms the 32 point DCT of FIG. 8.

Referring to FIG. 9, the operation process of the butterfly structure outputs an output value [Y1, Y2] via the equation $$\begin{bmatrix} Y1 \\ Y2 \end{bmatrix} = \begin{bmatrix} \cos\theta & -\sin\theta \\ \sin\theta & \cos\theta \end{bmatrix} \begin{bmatrix} X1 \\ X2 \end{bmatrix},$$

with respect to an input value [X1,X2].

When a DCT is performed based on the flow graph 800 of FIG. 8, cos θ and sin θ are used according to the value R(e). Similarly as described above with respect to the transformation performed based on the flow graph 200 of FIG. 2, the transformer 120 may perform a DCT with respect to an input block by performing only additions, subtractions, and a shift operation by using the fast transform matrix A which is obtained by substituting cos θ and sin θ based on the value of θ with dyadic rationals, or by using the fast transform matrix A which is obtained by multiplying each of the elements used for the DCT based on the flow graph 800 of FIG. 8 by $2^n$ and rounding up each of the multiplied elements to a respective nearest integer.

For example, a 1D DCT which is performed on a 32×32 input block by using the fast transform matrix A may be expressed as the following operation, wherein Xi (where i is an integer in the range of 0 to 31) denotes an input value to be transformed, Ai, Bi, Ci, Di, and Ei denote intermediate values, and Yi denotes a transform result value:

```
{
    /stage 0
    A0 = X0 + X15;A1 = X1 + X14; A2 = X2 + X13;A3 = X3 + X12;A4 = X4 +
X11;A5 = X5 + X10;A6 = X6 + X9;A7 = X7 + X8;A8 = X7 - X8;A9 = X6 - X9;A10 = X5 -
X10;A11 = X4 - X11;A12 = X3 - X12;A13 = X2 - X13;A14 = X1 - X14;A15 = X0 - X15;
    /stage 1
    B0 = A0 + A7;B7 = A0 - A7;B1 = A1 + A6;B6 = A1 - A6;B2 = A2 + A5;B5 = A2 -
A5;B3 = A3 + A4;B4 = A3 - A4;
    B8 = (49*A8 + 40*A15) >> 6;B15 = (-40*A8 + 49*A15) >> 6;B9 = (30*A9 - 56*A14) >>
6;B14 = (56*A9 + 30*A14) >> 6;B10 = (61*A10 + 18*A13) >> 6;B13 = (-18*A10 +
61*A13) >> 6;B11 = (6*A11 - 63*A12) >> 6;B12 = (63*A11 + 6*A12) >> 6;
    /stage 2
    C0 = B0 + B3;C3 = B0 - B3;C1 = B1 + B2;C2 = B1 - B2;
    C4 = (6*B4 + 31*B7, 5);C7 = (-31*B4 + 6*B7, 5);C5 = (35*B5 + 53*B6) >> 6;C6 =
(-53*B5 + 35*B6) >> 6;
    C8 = B8 + B11;C11 = B8 - B11;C9 = B9 + B10;C10 = B9 - B10;
    C12 = B12 + B15;C15 = B12 - B15;C13 = B13 + B14;C14 = B13 - B14;
    /stage 3
```

```
D0 = (45*(C0 + C1)) >> 6;D1 = (45*(-C0 + C1)) >> 6;
D2 = (24*C2 + 59*C3) >> 6;D3 = (-59*C2 + 24*C3) >> 6;
D4 = C4 + C5;D5 = C4 - C5;D6 = -C6 + C7;D7 = C6 + C7;
D8 = C8 + C14;D14 = C8 - C14;D9 = C9 + C15;D15 = C9 - C15;D10 = C10 +
C11; D11 = C10 - C11;D12 = C12 + C13;D13 = C12 - C13;
    /stage 4
    E5 = (45*(D5 + D7)) >> 6;E7 = (45*(-D5 + D7)) >> 6;
    E8 = (24*D8 - 59*D9) >> 6;E9 = (59*D8 + 24*D9) >> 6;
    E11 = (45*(D11 + D12)) >> 6;E12 = (45*(-D11 + D12)) >> 6;
    E14 = (24*D14 - 59*D15) >> 6;E15 = (59*D14 + 24*D15) >> 6;
    /stage 5
    Y0 = D0;Y8 = -D1 ;Y4 = D2;Y12 = D3;Y2 = D4;Y6 = E5;Y14 = D6;Y10 = -E7;Y3 =
E8;Y13 = E9;Y9 = D10;Y15 = E11;Y1 = E12;Y7 = D13;Y11 = -E14;Y5 = E15;
    }
```

According to another exemplary embodiment, the quantizer 130 may perform scaling by multiplying each element of the transformed block by a predetermined scaling constant. In detail, the quantizer 130 may perform scaling and quantization simultaneously with respect to an N×N transformed block by using a scaling constant QMat and a shift operation. The quantization and the scaling are performed by performing a bit shift operation on a value which is obtained by multiplying the scaling constant QMat and the N×N transformed block and then adding a predetermined offset to the value, by a q bit of the following equation: q=floor(QP/6)+m. When Zij denotes a quantized coefficient value, Wij denotes a transformation coefficient, and f denotes an offset, |Zij|=(|Wij|·QMat+f)>>qbits and sign(Zij=sign (Wif).

The scaling constant QMat may be selected based on the quantization parameter QP, and is defined with respect to Qstep values of 0.625, 0.6875, 0.8125, 0.875, 1, and 1.25 of only an initial six quantization steps, without having to be defined with respect to all quantization steps. As described above, when the quantization parameter QP increases by 6, the quantization step Qstep is doubled, and thus the scaling constant QMat may be defined with respect to the Qstep values of the initial six quantization steps, and the scaling constant QMat based on the other quantization parameters QP may be selected based on a (QP mod 6) value.

For example, if i=(QP mod 6), a scaling constant QMati for scaling with respect to a 16×16 transformed block which is obtained by performing a DCT based on the flow graph 200 or 800 of FIG. 2 or 8 may be defined as follows:

QMat0=81, QMat1=89, QMat2=105, QMat3=113, QMat4=129; QMat5=146

The scaling constant QMati is not limited thereto, and may be adjusted within a range of ±1 or ±2. In particular, the scaling constant QMati may be adjusted within a range of QMati±1 or QMati±2.

A scaling constant QMati for scaling with respect to a 32×32 transformed block which is obtained by performing a DCT based on the flow graph 200 or 800 of FIG. 2 or 8 may be defined as follows:

QMat0=40, QMat1=44, QMat2=52, QMat3=56, QMat4=64; QMat5=72

The scaling constant QMati is not limited thereto, and may be adjusted within a range of ±1 or ±2. In particular, the scaling constant QMati may be adjusted within a range of QMati±1 or QMati±2. For example, QMat0=40, QMat1=45, QMat2=51, QMat3=57, QMat4=64, and QMat5=72 may be used as the scaling constant QMati.

Further, in a dequantization operation, dequantization may be performed by applying a descaling constant and a shift operation in order to compensate for a difference between the original N×N inverse transform matrix Original_A-1 which is used for performing an IDCT, and the N×N fast inverse-transform matrix A-1, which is an inverse matrix of the N×N fast transform matrix A.

According to another exemplary embodiment, a descaling constant DQMat may be determined based on the quantization parameter QP. When the descaling constant DQMat is obtained as described above, descaling and dequantization may be performed by performing a bit shift operation on a value which is obtained by multiplying the descaling constant DQMat and a quantized transformation coefficient, by a floor(QP/6) bit, wherein floor[x] is a maximum integer smaller than or equal to x and QP denotes a quantization parameter. In particular, when Zij denotes a quantized coefficient value and Wij denotes a transformation coefficient, Wij may be obtained by descaling and dequantizing the quantized coefficient Zij via the following equation: Wij=(Zij)*DQMat<<floor(QP/6).

The descaling constant DQMat is defined with respect to Qstep values of 0.625, 0.6875, 0.8125, 0.875, 1, and 1.25 of only an initial six quantization steps, without having to be defined with respect to all quantization steps, because when the quantization parameter QP increases by 6, the quantization step Qstep is doubled, and thus the descaling constant DQMat may be defined with respect to the Qstep values of the initial six quantization steps, and the descaling constant DQMat based on the other quantization parameters QP may be selected based on a (QP mod 6) value.

For example, if i=(QP mod 6), a descaling constant MQMati which is used for descaling with respect to a 16×16 transformed block which is obtained by performing a DCT based on the flow graph 200 or 800 of FIG. 2 or 8 may be defined as follows:

DQMat0=81, DQMat1=89, DQMat2=105, DQMat3=113, DQMat4=129; DQMat5=146

The descaling constant DQMati is not limited thereto, and may be adjusted within a range of ±1 or ±2. In particular, the descaling constant DQMati may be adjusted within a range of QMati±1 or QMati±2.

A descaling constant DQMati which is used for descaling with respect to a 32×32 transformed block which is obtained by performing a DCT based on the flow graph 200 or 800 of FIG. 2 or 8 may be defined as follows:

DQMat0=40, DQMat1=44, DQMat2=52, DQMat3=56, DQMat4=64; DQMat5=72

The descaling constant DQMati is not limited thereto, and may be adjusted within a range of ±1 or ±2. In particular, the descaling constant DQMati may be adjusted within a range of QMati±1 or QMati±2. For example, DQMat0=40, DQMat1=45, DQMat2=51, DQMat3=57, DQMat4=64, and QMat5=72 may be used as the descaling constant DQMati.

FIG. 10 is a flowchart which illustrates a video encoding method, according to an exemplary embodiment.

Referring to FIG. 10, in operation 1010, the transformer 120 produces a fast transform matrix based on an N×N (where N is an integer) transform matrix which is used for performing a 1D DCT on an N×N block. As described above, the transformer 120 produces the fast transform matrix by using a fast transformation matrix which is formed of elements that are obtained by substituting the elements which are used for performing the DCT with rational numbers, or by multiplying each of the elements of the transformation matrix which is used for performing the DCT by a power of 2 and then rounding up each of the multiplied elements to a respective nearest integer.

In operation 1020, the transformer 120 produces an N×N transformed block by transforming the N×N block using the fast transform matrix.

In operation 1030, the quantizer 130 performs scaling on the N×N transformed block in order to correct a difference between the N×N transform matrix which is used for performing the 1D DCT and the fast transform matrix. As described above, the quantizer 130 performs scaling with respect to a transformed block by using the scaling matrix MF or the scaling constant QMat in order to reduce an error value as between a result of the transformation performed using the fast transform matrix A by the transformer 120 and a result of the transformation performed using the DCT matrix Original_A based on an actual floating point operation.

Figure 11:
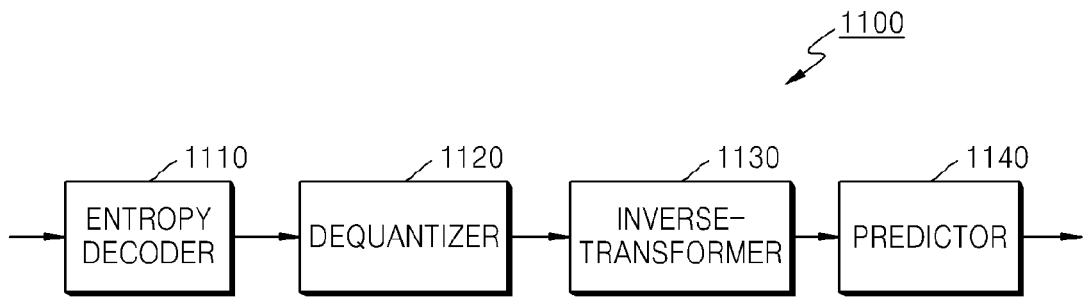
FIG. 11 is a block diagram of a video decoding apparatus, according to an exemplary embodiment.

FIG. 11 is a block diagram of a video decoding apparatus 1100, according to an exemplary embodiment.

Referring to FIG. 11, the video decoding apparatus 1100 includes an entropy decoder 1110, a dequantizer 1120, an inverse-transformer 1130, and a predictor 1140.

The entropy decoder 1110 extracts prediction mode information, reference picture information, and residual information of a current block to be decoded, from an input bitstream.

The dequantizer 1120 dequantizes quantized transformation coefficients, which are entropy-decoded by the entropy decoder 1110. In particular, according to an exemplary embodiment, the dequantizer 1120 performs descaling on an N×N transformed block in order to correct a difference between an N×N inverse-transform matrix for use in performing a 1D IDCT with respect to a quantized N×N transformed block and a fast inverse-transform matrix which is produced based on the N×N inverse-transform matrix.

The inverse-transformer 1130 inverse-transforms the dequantized transformation coefficients. Accordingly, residual values for each block are restored. The inverse transformation may be performed by performing an N-point IDCT by using an inverse matrix A-1 of an N×N fast transform matrix A which may be acquired according to any one of various exemplary embodiments. The inverse-transformer 1130 performs an IDCT by using a fast transformation matrix which is formed of elements that are obtained by substituting the elements of an inverse-transform matrix used for performing the IDCT with rational numbers, or by multiplying each of the elements of the inverse-transform matrix by a power of 2 and then rounding up each of the multiplied elements to a respective nearest integer.

An IDCT which is performed on a 16×16 transformed block by using the flow graph 200 of FIG. 2 may be expressed as the following operation, wherein Xi (where i is an integer in the range of 0 to 15) denotes an input value, Bi, Ci, Di, Ei, and Fi denote intermediate values, and Yi denotes an inverse-transform result value:

```
{
/stage 0
  F8 = ( 6*X1 - 63*X15 ) >> 6;F9 = ( 49*X9 - 40*X7 ) >> 6;F10 = ( 30*X5 - 56*X11 ) >> 6;F11 = ( 61*X13 - 18*X3 ) >> 6;F12 = ( 61*X3 + 18*X13 ) >> 6;F13 = ( 30*X11 + 56*X5 ) >> 6;F14 = ( 49*X7 + 40*X9 ) >> 6;F15 = ( 6*X15 + 63*X1 ) >> 6;
/stage 1
  E4 = ( 12*X2 - 62*X14 ) >> 6;E5 = ( 53*X10 - 35*X6 ) >> 6;E6 = ( 53*X6 + 35*X10 ) >> 6;E7 = ( 12*X14 + 62*X2 ) >> 6;E8 = F8 + F9;E9 = F8 - F9;E10 = F11 - F10;E11 = F11 + F10;E12 = F12 + F13;E13 = F12 - F13;E14 = F15 - F14;E15 = F15 + F14;
/stage 2
  D0 = ( 45*( X0 + X8 ) ) >> 6;D1 = ( 45*( X0 - X8 ) ) >> 6;D2 = ( 24*X4 - 59*X12 ) >> 6;D3 = ( 59*X4 + 24*X12 ) >> 6;D4 = E4 + E5;D5 = E4 - E5;D6 = E7 - E6;D7 = E7 + E6;D9 = ( 24*E14 - 59*E9 ) >> 6;D10 = ( - 59*E13 - 24*E10 ) >> 6;D13 = ( 24*E13 - 59*E10 ) >> 6;D14 = ( 59*E14 + 24*E9 ) >> 6;
/stage 3
  C0 = D0 + D3;C3 = D0 - D3;C8 = E8 + E11;C11 = E8 - E11;C12 = E15 - E12;C15 = E15 + E12;C1 = D1 + D2;C2 = D1 - D2;C9 = D9 + D10;C10 = D9 - D10;C13 = D14 - D13;C14 = D14 + D13;C5 = ( 45*( D6 - D5 ) ) >> 6;C6 = ( 45*( D6 + D5) ) >> 6;
/stage 4
  B0 = C0 + D7;B7 = C0 - D7;B1 = C1 + C6;B6 = C1 - C6;B2 = C2 + C5;B5 = C2 - C5;B3 = C3 + D4;B4 = C3 - D4;B10 = ( 45*( C13 - C10 ) ) >> 6;B13 = ( 45*( C13 + C10 ) ) >> 6;B11 = ( 45*( C12 - C11 ) ) >> 6;B12 = ( 45*( C12 + C11 ) ) >> 6;
/stage 5
  Y0 = B0 + C15;Y15 = B0 - C15;Y1 = B1 + C14;Y14 = B1 - C14;Y2 = B2 + B13;Y13 = B2 - B13;Y3 = B3 + B12;Y12 = B3 - B12;Y4 = B4 + B11;Y11 = B4 - B11;Y5 = B5 + B10;Y10 = B5 - B10;Y6 = B6 + C9;Y9 = B6 - C9;Y7 = B7 + C8;Y8 = B7 - C8;
}
```

An IDCT which is performed on a 32×32 transformed block by using the flow graph 200 of FIG. 2 may be expressed as the following operation, wherein Xi (where i is an integer in the range of 0 to 31) denotes an input value, Ai, Bi, Ci, Di, Ei, and Fi denote intermediate values, and Yi denotes an inverse-transform result value:

```
{
/stage 0
  G16 = ( 12*X1 - 255*X31 ) >> 8;G17 = ( 189*X17 - 171*X15 ) >> 8;G18 = ( 109*X9 - 231*X23 ) >> 8;G19 = ( 241*X25 - 86*X7 ) >> 8;G20 = ( 62*X5 - 248*X27 ) >> 8;G21 =
```

-continued ( 219*X21 − 131*X11) >> 8;G22 = ( 152*X13 − 205*X19) >> 8;G23 = ( 253*X29 − 37*X3) >> 8;G24 = ( 253*X3 + 37*X29) >> 8;G25 = ( 152*X19 + 205*X13) >> 8;G26 = ( 219*X11 + 131*X21) >> 8;G27 = ( 62*X27 + 248*X5) >> 8;G28 = ( 241*X7 + 86*X25) >> 8;G29 = ( 109*X23 + 231*X9) >> 8;G30 = ( 189*X15 + 171*X17) >> 8;G31 = ( 12*X31 + 255*X1) >> 8;
/stage 1
F8 = ( 25*X2 − 254*X30) >> 8;F9 = ( 197*X18 − 162*X14) >> 8;F10 = ( 120*X10 − 225*X22) >> 8;F11 = ( 244*X26 − 74*X6) >> 8;F12 = ( 244*X6 + 74*X26) >> 8;F13 = ( 120*X22 + 225*X10) >> 8;F14 = ( 197*X14 + 162*X18) >> 8;F15 = ( 25*X30 + 254*X2) >> 8;F16 = G16 + G17;F17 = G16 − G17;F18 = G19 − G18;F19 = G19 + G18;F20 = G20 + G21 ;F21 = G20 − G21 ;F22 = G23 − G22;F23 = G23 + G22;F24 = G24 + G25;F25 = G24 − G25;F26 = G27 − G26;F27 = G27 + G26;F28 = G28 + G29;F29 = G28 − G29;F30 = G31 − G30;F31 = G31 + G30;
/stage 2
E4 = ( 49*X4 − 251*X28) >> 8;E5 = ( 212*X20 − 142*X12) >> 8;E6 = ( 212*X12 + 142*X20) >> 8;E7 = ( 49*X28 + 251*X4) >> 8;E8 = F8 + F9;E9 = F8 − F9;E10 = F11 − F10;E11 = F11 + F10;E12 = F12 + F13;E13 = F12 − F13;E14 = F15 − F14;E15 = F15 + F14;E17 = ( 49*F30 − 251*F17) >> 8;E18 = ( − 251*F29 − 49*F18) >> 8;E21 = ( 212*F26 − 142*F21) >> 8;E22 = ( − 142*F25 − 212*F22) >> 8;E25 = ( 212*F25 − 142*F22) >> 8;E26 = ( 142*F26 + 212*F21) >> 8;E29 = ( 49*F29 − 251*F18) >> 8;E30 = ( 251*F30 + 49*F17) >> 8;
/stage 3
D0 = ( 181*( X0 + X16 )) >> 8;D1 = ( 181*( X0 − X16 )) >> 8;D2 = ( 97*X8 − 236*X24) >> 8;D3 = ( 236*X8 + 97*X24) >> 8;D4 = E4 + E5;D5 = E4 − E5;D6 = E7 − E6;D7 = E7 + E6;D9 = ( 97*E14 − 236*E9) >> 8;D10 = (−236*E13 − 97*E10) >> 8;D13 = ( 97*E13 − 236*E10) >> 8;D14 = (236*E14 + 97*E9) >> 8;D16 = F16 + F19;D19 = F16 − F19;D20 = F23 − F20;D23 = F23 + F20;D24 = F24 + F27;D27 = F24 − F27;D28 = F31 − F28;D31 = F31 + F28;D17 = E17+ E18;D18 = E17− E18;D21 = E22 − E21;D22 = E22 + E21 ;D25 = E25 + E26;D26 = E25 − E26;D29 = E30 − E29;D30 = E30 + E29;
/stage 4
C0 = D0 + D3;C3 = D0 − D3;C8 = E8 + E11;C11 = E8 − E11;C12 = E15 − E12;C15 = E15 + E12;C1 = D1 + D2;C2 = D1 − D2;C9 = D9 + D10;C10 = D9 − D10;C13 = D14 − D13;C14 = D14 + D13;C5 = ( 181*( D6 − D5 )) >> 8;C6 = ( 181*( D6 + D5 )) >> 8;C18 = ( 97*D29 − 236*D18) >> 8;C20 = (− 236*D27 − 97*D20) >> 8;C26 = (− 236*D21 + 97*D26) >> 8;C28 = ( 97*D19 + 236*D28) >> 8;C19 = ( 97*D28 − 236*D19) >> 8;C21 = (− 236*D26 − 97*D21) >> 8;C27 = (− 236*D20 + 97*D27) >> 8;C29 = ( 97*D18 + 236*D29) >> 8;
/stage 5
B0 = C0 + D7;B7 = C0 − D7;B1 = C1 + C6;B6 = C1 − C6;B2 = C2 + C5;B5 = C2 − C5;B3 = C3 + D4;B4 = C3 − D4;B10 = ( 181*( C13 − C10 )) >> 8;B13 = ( 181*( C13 + C10 )) >> 8;B11 = ( 181(C12 − C11 )) >> 8;B12 = ( 181(C12 + C11 )) >> 8;B16 = D16 + D23;B23 = D16 − D23;B24 = D31 − D24;B31 = D31 + D24;B17 = D17 + D22;B22 = D17 − D22;B25 = D30 − D25;B30 = D30 + D25;B18 = C18 + C21;B21 = C18 − C21;B26 = C29 − C26;B29 = C29 + C26;B19 = C19 + C20;B20 = C19 − C20;B27 = C28 − C27;B28 = C28 + C27;
/stage 6
A0 = B0 + C15;A15 = B0 − C15;A1 = B1 + C14;A14 = B1 − C14;A2 = B2 + B13;A13 = B2 − B13;A3 = B3 + B12;A12 = B3 − B12;A4 = B4 + B11;A11 = B4 − B11;A5 = B5 + B10;A10 = B5 − B10;A6 = B6 + C9;A9 = B6 − C9;A7 = B7 + C8;A8 = B7 − C8;A20 = ( 181*( B27 − B20 )) >> 8;A27 = ( 181*( B27 + B20 )) >> 8;A21 = ( 181*( B26 − B21 )) >> 8;A26 = ( 181*( B26 + B21 )) >> 8;A22 = ( 181*( B25 − B22 )) >> 8;A25 = ( 181*( B25 + B22 )) >> 8;A23 = ( 181*( B24 − B23 )) >> 8;A24 = ( 181*( B24 + B23)) >> 8;
/stage 7
Y0 = A0 + B31;Y31 = A0 − B31;Y1 = A1 + B30;Y30 = A1 − B30;Y2 = A2 + B29;Y29 = A2 − B29;Y3 = A3 + B28;Y28 = A3 − B28;Y4 = A4 + A27;Y27 = A4 − A27;Y5 = A5 + A26;Y26 = A5 − A26;Y6 = A6 + A25;Y25 = A6 − A25;Y7 = A7 + A24;Y24 = A7 − A24;Y8 = A8 + A23;Y23 = A8 − A23;Y9 = A9 + A22;Y22 = A9 − A22;Y10 = A10 + A21;Y21 = A10 − A21;Y11 = A11 + A20;Y20 = A11 − A20;Y12 = A12 + B19;Y19 = A12 − B19;Y13 = A13 + B18;Y18 = A13 − B18;Y14 = A14 + B17;Y17 = A14 − B17;Y15 = A15 + B16;Y16 = A15 − B16;
}

An IDCT which is performed on a 16×16 transformed block by using the flow graph 800 of FIG. 8 may be expressed as the following operation, wherein Xi (where i is an integer in the range of 0 to 15) denotes an input value, Ai, Bi, Ci, Di, and Ei denote intermediate values, and Yi denotes an inverse-transform result value:

{
/stage 0
D0 = X0;D1 = −X8;D2 = X4;D3 = X12;D4 = X2;E5 = X6 ;D6 = X14;E7 = −X10;E8 = X3;E9 = X13;D10 = X9;E11 = X15;E12 = X1;D13 = X7;E14 = −X11;E15 = X5;
/stage 1
D5 = (45*(E5 − E7)) >> 6;D7 = (45*(E5 + E7)) >> 6;
D8 = (24*E8 + 59*E9) >> 6;D9 = (−59*E8 + 24*E9) >> 6;
D11 = (45*(E11 − E12)) >> 6;D12 = (45*(E11 + E12)) >> 6;
D14 = (24*E14 + 59*E15) >> 6;D15 = (−59*E14 + 24*E15) >> 6;

```
    /stage 2
    C0 = (45*(D0 - D1)) >> 6;C1 = (45*(D0 + D1)) >> 6;
    C2 = (24*D2 - 59*D3) >> 6;C3 = (59*D2 + 24*D3) >> 6;
    C4 = D4 + D5;C5 = D4 - D5;C6 = -D6 + D7;C7 = D6 + D7;
    C8 = D8 + D14;C14 = D8 - D14;C9 = D9 + D15;C15 = D9 - D15;C10 = D10 +
D11; C11 = D10 - D11;C12 = D12 + D13;C13 = D12 - D13;
    /stage 3
    B0 = C0 + C3;B3 = C0 - C3;B1 = C1 + C2;B2 = C1 - C2;
    B4 = (6*C4 - 31*C7, 5);B7 = (31*C4 + 6*C7, 5);B5 = (35*C5 - 53*C6) >> 6;B6 =
(53*C5 + 35*C6) >> 6;
    B8 = C8 + C11;B11 = C8 - C11;B9 = C9 + C10;B10 = C9 - C10;
B12 = C12 + C15;B15 = C12 - C15;B13 = C13 + C14;B14 = C13 - C14;
    /stage 4
    A0 = B0 + B7;A7 = B0 - B7;A1 = B1 + B6;A6 = B1 - B6;A2 = B2 + B5;A5 = B2 -
B5;A3 = B3 + B4;A4 = B3 - B4;
    A8 = (49*B8 - 40*B15) >> 6;A15 = (40*B8 + 49*B15) >> 6;A9 = (30*B9 + 56*B14) >>
6;A14 = (-56*B9 + 30*B14) >> 6;A10 = (61*B10 - 18*B13) >> 6;A13 = (18*B10 +
61*B13) >> 6;A11 = (6*B11 + 63*B12) >> 6;A12 = (-63*B11 + 6*B12) >> 6;
    /stage 5
    Y0 = A0 + A15;Y1 = A1 + A14;Y2 = A2 + A13;Y3 = A3 + A12;Y4 = A4 +
A11 ;Y5 = A5 + A10;Y6 = A6 + A9;Y7 = A7 + A8;Y8 = A7 - A8;Y9 = A6 - A9;Y10 = A5 -
A10;Y11 = A4 - A11 ;Y12 = A3 - A12;Y13 = A2 - A13;Y14 = A1 - A14;Y15 = A0 - A15;
    }
```

An IDCT which is performed on a 32×32 transformed block by using the flow graph 800 of FIG. 8 may be expressed as the following operation, wherein $X_i$ (where i is an integer in the range of 0 to 31) denotes an input value, $Z_i$, $A_i$, $B_i$, $C_i$, $D_i$, $E_i$, and $F_i$ denote intermediate values, and $Y_i$ denotes an inverse-transform result value:

```
    {
    /stage 0
    D0= X0;E24 = X1;E12 = X2;F16 = -X3;D4 = X4; F31 = X5; E8 = X6; E26 = -
X7;D2 = X8; E21 = X9; E15 = X10; F29 = X11;E5 = X12; F18 = -X13; D13 = X14;
D22 = X15;D1 = -X16; D25 = X17; D10 = X18; F19 = -X19;E7 = -X20; F28 = -X21 ;
E14 = -X22; E20 = -X23;D3 = X24; E27 = -X25; E9 = X26; F30 = -X27;D6 = X28; F17 =
-X29; E11 = X30; E23 = -X31;
    /stage 1
    E16 = (251*F16 + 49*F17) >> 8;E17 = (-49*F16 + 251*F17) >> 8;E18 = (212*F18 +
142*F19) >> 8;E19 = (-142*F18 + 212*F19) >> 8;
    E28 = (212*F28 + 142*F29) >> 8;E29 = (-142*F28 + 212*F29) >> 8;E30 =
(251*F30 + 49*F31) >> 8;E31 = (-49*F30 + 251*F31) >> 8;
    /stage 2
    D5 = (181*(E5 - E7)) >> 8;D7 = (181*(E5 + E7)) >> 8;
    D8 = (97*E8 + 236*E9) >> 8;D9 = (-236*E8 + 97*E9) >> 8;
    D11 = (181*(E11 - E12)) >> 8;D12 = (181*(E11 + E12)) >> 8;
    D14 = (97*E14 + 236*E15) >> 8;D15 = (-236*E14 + 97*E15) >> 8;
    D16 = E16 + E18;C18 = E16 - E18;C17 = E17 + E19;D19 = E17 - E19;
    D20 = (236*E20 - 97*E21) >> 8;D21 = (97*E20 + 236*E21) >> 8;D23 =
(181*(E23 - E24)) >> 8;D24 = (181*(E23 + E24)) >> 8;D26 = (236*E26 - 97*E27) >>
8;D27 = (97*E26 + 236*E27) >> 8;D28 = - E28 + E30;C30 = E28 + E30;C29 = - E29 +
E31 ;D31 = E29 + E31;
    /stage 3
    C0 = (181*(D0 - D1)) >> 8;C1 = (181*(D0 + D1)) >> 8;
    C2 = (97*D2 - 236*D3) >> 8;C3 = (236*D2 + 97*D3) >> 8;
    C4 = D4 + D5;C5 = D4 - D5;C6 = -D6 + D7; C7 = D6 + D7;
    C8 = D8 + D14;C14 = D8 - D14;C9 = D9 + D15;C15 = D9 - D15;C10 = D10 +
D11; C11 = D10 - D11;C12 = D12 + D13;C13 = D12 - D13;
    C16 = (181*(D16 - D19)) >> 8;C19 = (181*(D16 + D19)) >> 8;C20 = D20 +
D26;C26 = D20 - D26;C21 = D21 + D27;C27 = D21 - D27;C22 = D22 + D23;C23 = D22 -
D23;C24 = D24 + D25;C25 = D24 - D25;C28 = (181*(D28 - D31)) >> 8;C31 =
(181*(D28 + D31)) >> 8;
    /stage 4
    B0 = C0 + C3;B3 = C0 - C3;B1 = C1 + C2;B2 = C1 - C2;
    B4 = (49*C4 - 251*C7) >> 8;B7 = (251*C4 + 49*C7) >> 8;B5 = (142*C5 - 212*C6) >>
8;B6 = (212*C5 + 142*C6) >> 8;
    B8 = C8 + C11;B11 = C8 - C11;B9 = C9 + C10;B10 = C9 - C10;
    B12 = C12 + C15;B15 = C12 - C15;B13 = C13 + C14;B14 = C13 - C14;
    B16 = C16 + C28;B28 = C16 - C28;B17 = C17 + C29;B29 = C17 - C29;B18 =
C18 + C30;B30 = C18- C30;B19 = C19 + C31;B31 = C19 - C31;
    B20 = C20 + C23;B23 = C20 - C23;B21 = C21 + C22;B22 = C21 - C22;
    B24 = C24 + C27;B27 = C24 - C27;B25 = C25 + C26;B26 = C25 - C26;
    /stage 5
    A0 = B0 + B7;A7 = B0 - B7;A1 = B1 + B6;A6 = B1 - B6;A2 = B2 + B5;A5 = B2 -
B5;A3 = B3 + B4;A4 = B3 - B4;
    A8 = (197*B8 - 162*B15) >> 8;A15 = (162*B8 + 197*B15) >> 8;A9 = (120*B9 +
225*B14) >> 8;A14 = (-225*B9 + 120*B14) >> 8;A10 = (244*B10 - 74*B13) >> 8;A13 =
(74*B10 + 244*B13) >> 8;A11 = (25*B11 + 254*B12) >> 8;A12 = (-254*B11 + 25*B12) >> 8;
```

-continued

A16 = B16 + B23;A23 = B16 − B23;A17 = B17 + B22;A22 = B17 − B22;A18 = B18 + B21;A21 = B18 − B21;A19 = B19 + B20;A20 = B19 − B20;
A24 = B24 + B31;A31 = B24 − B31;A25 = B25 + B30;A30 = B25 − B30;A26 = B26 + B29;A29 = B26 − B29;A27 = B27 + B28;A28 = B27 − B28;

/stage 6
Z0 = A0 + A15;Z1 = A1 + A14;Z2 = A2 + A13;Z3 = A3 + A 12;Z4 = A4 + A11;Z5 = A5 + A10;Z6 = A6 + A9;Z7 = A7 + A8;Z8 = A7 − A8;Z9 = A6 − A9;Z10 = A5 − A10;Z11 = A4 − A11;Z12 = A3 − A12;Z13 = A2 − A13;Z14 = A1 − A14;Z15 = A0 − A15;
Z16 = (171*A16 + 189*A31) >> 8;Z31 = (−189*A16 + 171*A31) >> 8;Z17 = (205*A17 − 152*A30) >> 8;Z30 = (152*A17 + 205*A30) >> 8;Z18 = (131*A18 + 219*A29) >> 8;Z29 = (−219*A18 + 131*A29) >> 8;Z19 = (231*A19 − 109*A28) >> 8;Z28 = (109*A19 + 231*A28) >> 8;Z20 = (86*A20 + 241*A27) >> 8;Z27 = (−241*A20 + 86*A27) >> 8;Z21 = (248*A21 − 62*A26) >> 8;Z26 = (62*A21 + 248*A26) >> 8;Z22 = (37*A22 + 253*A25) >> 8;Z25 = (−253*A22 + 37*A25) >> 8;Z23 = (255*A23 − 12*A24) >> 8;Z24 = (12*A23 + 255*A24) >> 8;

/stage 7
Y0 = Z0 + Z31;Y31 = Z0 − Z31;Y1 = Z1 + Z30;Y30 = Z1 − Z30;Y2 = Z2 + Z29;Y29 = Z2 − Z29;Y3 = Z3 + Z28;Y28 = Z3 − Z28;Y4 = Z4 + Z27;Y27 = Z4 − Z27;Y5 = Z5 + Z26;Y26 = Z5 − Z26;Y6 = Z6 + Z25;Y25 = Z6 − Z25;Y7 = Z7 + Z24;Y24 = Z7 − Z24;Y8 = Z8 + Z23;Y23 = Z8 − Z23;Y9 = Z9 + Z22;Y22 = Z9 − Z22;Y10 = Z10 + Z21;Y21 = Z10 − Z21;Y11 = Z11 + Z20;Y20 = Z11 − Z20;Y12 = Z12 + Z19;Y19 = Z12 − Z19;Y13 = Z13 + Z18;Y18 = Z13 − Z18;Y14 = Z14 + Z17;Y17 = Z14 − Z17;Y15 = Z15 + Z16;Y16 = Z15 − Z16;
}

Figure 12:
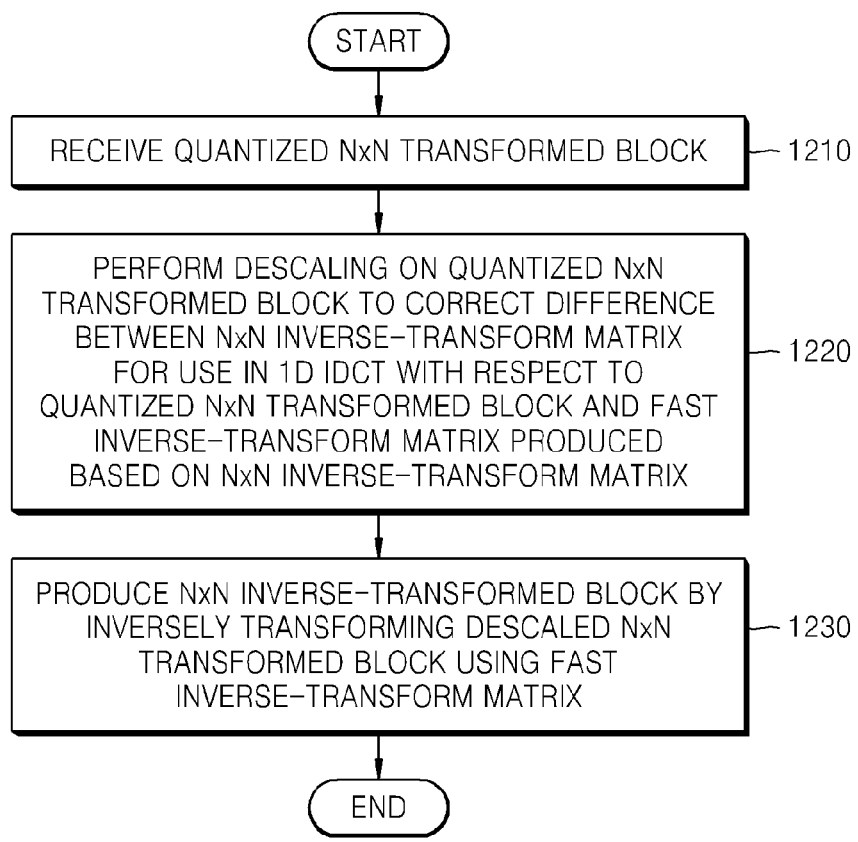
FIG. 12 is a flowchart which illustrates a video decoding method, according to an exemplary embodiment.

FIG. 12 is a flowchart which illustrates a video decoding method, according to an exemplary embodiment.

Referring to FIG. 12, in operation 1210, the dequantizer 1120 receives a quantized N×N transformed block. In operation 1220, the dequantizer 1120 performs descaling on the quantized N×N transformed block in order to correct a difference between an N×N inverse-transform matrix for use in performing a 1D IDCT with respect to the quantized N×N transformed block and a fast inverse-transform matrix which is produced based on the N×N inverse-transform matrix. As described above, descaling may be performed simultaneously with dequantization, and descaling may be performed with respect to a quantized transformation coefficient by using the descaling matrix V or the descaling constant DQMat, which is determined based on the quantization parameter QP.

In operation 1230, the inverse-transformer 1130 produces an N×N inverse-transformed block by inversely transforming a descaled N×N transformed block using the fast inverse-transform matrix. As described above, the fast inverse-transform matrix is the inverse matrix A−1 of the N×N fast transform matrix A which may be acquired according to any one of various exemplary embodiments, and an IDCT is performed by using a fast transformation matrix which is formed of elements that are obtained by substituting the elements of an inverse-transform matrix which is used for performing the IDCT with rational numbers, or by multiplying each of the elements of the inverse-transform matrix by a power of 2 and then rounding up each of the multiplied elements to a respective nearest integer.

One or more exemplary embodiments can also be embodied as computer readable codes on a transitory or non-transitory computer readable recording medium. The computer readable recording medium may include any data storage device that can store data which can be thereafter read by a computer system. Examples of the non-transitory computer readable recording medium include read-only memory (ROM), random-access memory (RAM), compact disk ROM (CD-ROMs), magnetic tapes, floppy disks, optical data storage devices, and/or any other suitable medium. The computer readable recording medium can also be distributed over network-coupled computer systems so that the computer readable code is stored and executed in a distributed fashion.

While the present inventive concept has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A video decoding apparatus comprising a processor configured to:
   receive a quantized transform block which has a predetermined size,
   determine a scaling constant for scaling of transform coefficients included in the quantized transform block based on a quantization parameter,
   scale the transform coefficients by using the scaling constant, and
   inverse-transform the transform block that includes the scaled transform coefficients,
   wherein, where i denotes a remainder after the quantization parameter is divided by 6, the scaling constant for i=0 is 40, the scaling constant for i=1 is 45, the scaling constant for i=2 is 51, the scaling constant for i=3 is 57, the scaling constant for i=4 is 64, and the scaling constant for i=5 is 72.

* * * * *